United States Patent
Conway et al.

(10) Patent No.: US 9,933,000 B2
(45) Date of Patent: Apr. 3, 2018

(54) CLIP ASSEMBLY FOR USE HOLDING SINUOUS SPRINGS

(71) Applicant: L&P Property Management Company, South Gate, CA (US)

(72) Inventors: Lawrence J. Conway, Des Plaines, IL (US); Richard F. Paeth, St. Charles, IL (US)

(73) Assignee: L&P Property Management Company, South Gate, CA (US)

( * ) Notice: Subject to any disclaimer, the term of this patent is extended or adjusted under 35 U.S.C. 154(b) by 366 days.

(21) Appl. No.: 14/744,670

(22) Filed: Jun. 19, 2015

(65) Prior Publication Data

US 2016/0369825 A1 Dec. 22, 2016

(51) Int. Cl.
| | |
|---|---|
| A47C 31/06 | (2006.01) |
| A47C 31/00 | (2006.01) |
| F16B 2/24 | (2006.01) |
| F16B 2/00 | (2006.01) |
| A47C 23/05 | (2006.01) |
| A47C 7/34 | (2006.01) |

(52) U.S. Cl.
CPC .............. *F16B 2/245* (2013.01); *A47C 7/347* (2013.01); *A47C 23/0515* (2013.01); *F16B 2/005* (2013.01)

(58) Field of Classification Search
CPC .. Y10T 24/3455; Y10T 24/3459; F16B 2/245; F16B 2/005; A47C 19/021; A47C 31/06; A47C 23/057
See application file for complete search history.

(56) References Cited

U.S. PATENT DOCUMENTS

| | | | | |
|---|---|---|---|---|
| 2,111,404 | A | * | 3/1938 | Pankonin ................. B65D 9/32 206/340 |
| 2,574,811 | A | * | 11/1951 | Blumensaadt ........ B25B 27/146 140/111 |
| 3,083,369 | A | * | 4/1963 | Peterson ................. F16B 15/08 206/345 |
| 3,126,601 | A | * | 3/1964 | Marre ....................... A41F 1/00 223/37 |
| 3,323,183 | A | * | 6/1967 | Sterner ................... A47C 31/06 267/111 |
| 3,422,468 | A | * | 1/1969 | Schutz ................... A47C 31/06 403/188 |
| 3,553,794 | A | * | 1/1971 | Kneidl et al. .......... B65D 63/14 206/340 |
| 3,613,878 | A | * | 10/1971 | Langas .............. A47C 23/0515 206/340 |

(Continued)

FOREIGN PATENT DOCUMENTS

DE 2250375 7/1973

*Primary Examiner* — Jason W San
(74) *Attorney, Agent, or Firm* — Wood, Herron & Evans, LLP

(57) ABSTRACT

A piece of furniture includes a rectangular frame for supporting a plurality of sinuous springs. A plurality of clip assemblies are secured to opposed side walls of the frame. Each clip assembly comprises a metallic clip having tabs for holding a plastic liner inside a curved portion of the clip assembly. Each clip assembly also has a detent which inhibits movement of the sinuous spring and has tacks for insertion into the frame. Flexible connectors may be located in grooves of the clip assembly to collate multiple clip assemblies.

20 Claims, 21 Drawing Sheets

(56) References Cited

U.S. PATENT DOCUMENTS

| | | | | |
|---|---|---|---|---|
| 3,711,931 A * | 1/1973 | Ladouceur | B23P 13/00 | 206/338 |
| 3,722,670 A * | 3/1973 | Plunkett | B25B 27/146 | 206/340 |
| 3,845,860 A * | 11/1974 | Ladouceur | B23P 13/00 | 206/338 |
| 3,874,263 A * | 4/1975 | Barth | F16B 15/06 | 411/474 |
| 3,992,853 A * | 11/1976 | Morris | A47C 31/06 | 24/598.1 |
| 4,062,087 A * | 12/1977 | Lingle | A47C 31/06 | 24/347 |
| 4,153,959 A * | 5/1979 | Omley | A47C 31/06 | 24/350 |
| 4,454,636 A * | 6/1984 | Pearson | A47C 31/06 | 24/347 |
| 4,508,220 A * | 4/1985 | Pearson | A47C 31/06 | 206/338 |
| 4,935,998 A * | 6/1990 | Frazier | A47C 31/06 | 24/347 |
| D330,851 S * | 11/1992 | Roick | D8/367 | |
| 5,303,821 A * | 4/1994 | Ayres | F16B 15/0015 | 206/338 |
| 5,314,065 A * | 5/1994 | Ayres | F16B 15/0015 | 206/340 |
| 5,505,436 A * | 4/1996 | Roick | A47C 31/06 | 267/107 |
| 5,542,775 A * | 8/1996 | Bechtoldt | A47C 31/06 | 24/350 |
| 5,564,564 A * | 10/1996 | Poffenberger | B65D 69/00 | 206/338 |
| 5,682,994 A | 11/1997 | Poffenberger | | |
| 5,833,064 A * | 11/1998 | Ayres | A47C 31/06 | 206/340 |
| 5,878,880 A * | 3/1999 | Poffenberger | B65D 69/00 | 206/338 |
| 5,927,491 A * | 7/1999 | Room | F16B 15/08 | 206/340 |
| 6,055,716 A | 5/2000 | Ayres et al. | | |
| 6,415,481 B1 * | 7/2002 | Lackler | A47C 23/057 | 24/347 |
| 6,481,067 B2 | 11/2002 | Lackler | | |
| 6,616,239 B2 * | 9/2003 | Guillot | A47C 7/30 | 267/81 |
| 6,704,974 B2 * | 3/2004 | Lackler | A47C 23/057 | 24/347 |
| 7,849,541 B2 * | 12/2010 | Gauger | A47C 19/021 | 5/400 |
| 7,882,948 B2 * | 2/2011 | West | B21D 53/36 | 206/338 |
| 8,991,016 B2 * | 3/2015 | Conway | A47C 31/06 | 206/338 |
| 9,427,094 B2 * | 8/2016 | Conway | A47C 23/16 | |
| 2002/0138955 A1 | 10/2002 | Lackler | | |
| 2014/0096346 A1 | 4/2014 | Conway et al. | | |
| 2016/0029825 A1 * | 2/2016 | Perrin | A47G 25/1471 | 223/85 |

* cited by examiner

CLIP ASSEMBLY FOR USE HOLDING SINUOUS SPRINGS

FIELD OF THE INVENTION

This invention relates generally to clip assemblies for use in the manufacture of furniture and, more particularly, for holding sinuous springs in position in furniture.

BACKGROUND OF THE INVENTION

In many industries, as, for example, in the mattress or bedding industry, it is common practice to secure a wire or rod, such as a spring element of a mattress, to a border wire with a clip made from sheet metal. Such clips are generally in a U-shape having an arcuate crown portion and oppositely spaced leg portions depending from the crown portion. The two wires to be connected are placed between the leg portions of the clip and the leg portions pushed together by a clinching tool, thus securing or locking the two wires together.

Such a clinching tool typically includes a J-shaped jaw into which the leading clip of a stack of clips is indexed. The clinching tool has a blade which shears off the first clip from a stack of clips placed inside the clinching tool. U.S. Pat. No. 2,574,811 shows such a clinching tool.

In order to operate the clinching tool, it is necessary to place a plurality of clips inside the clinching tool in an orderly fashion. The clips must be similarly oriented and in an abutting relationship to one another, each clip abutting the two adjacent clips in an orderly fashion. Clips must be interconnected to each other in a flexible manner so that the stack of clips can be wound into the clinching tool. The clips must also be interconnected with sufficient strength so that they are able to withstand high tensile forces associated with winding and unwinding of the stack of clips upon a spool in the clinching machine. Accidental breakage of the connector connecting adjacent clips would be detrimental to the operation of the clinching machine.

One common way used to interconnect similar U-shaped sheet metal clips together is by means of non-metal, elongated flexible members made of plastic. Slots or grooves through the arcuate portion of each U-shaped clip are lined up, such that the non-metallic flexible members may be placed inside all of the grooves in order to connect the clips together in a flexible manner.

U.S. Pat. No. 5,833,064 discloses a clip made of sheet metal having a U-shaped hook portion inside which is secured a sheet of cushioning material, such as plastic. When a wire is placed inside the hook portion, the cushioning material prevents wire-on-wire noise, such as squeaking. Over time, these plastic liners may wear out and allow an end portion of a sinuous wire to move/shift inside the worn plastic liner thereby creating unwanted squeaking or "noise". The clip assemblies of U.S. Pat. No. 5,833,064 may be connected to identical clip assemblies in a string. The clips have prongs or tacks inherently formed from the sheet metal, the prongs being bent downwardly and adapted to be inserted into wooden rails of furniture frames.

Thus, there is a need for a U-shaped clip assembly which may be made partially of metal and partially of plastic which inhibits movement of the wire thereby preventing squeaking or "noise" after a sinuous spring is applied.

There is further a need for a metal clip for a U-shaped clip assembly which provides improved holding strength when inserted inside wooden rails of furniture frames.

SUMMARY OF THE INVENTION

This invention comprises a clip assembly for securing an end portion of a sinuous spring to a wooden rail. The clip assembly comprises two components: a metal clip and a plastic liner.

The metal clip has a generally planar body portion and a generally planar flange portion extending outwardly from one end of the body portion opposite a U-shaped hook portion in a direction perpendicular to the body portion. The flange portion has at least two tacks extending outwardly from the flange portion and spaced grooves adapted to receive flexible connectors to join multiple clip assemblies together. Each tack may have teeth on one or more surfaces to ensure a sturdy, secure connection of the clip assembly to the wood of the furniture frame. The U-shaped hook portion has a detent formed from the material of the metal clip.

The plastic liner is secured in the U-shaped hook portion of the metal clip via tabs formed from the material of the metal clip. In one embodiment, two tabs are formed from the metal material of the body portion of the metal clip and two additional tabs are formed from the U-shaped hook portion of the metal clip. The tabs overlay the plastic liner to keep it in place. The plastic liner lays over the metal detent which creates a bump which functions to inhibit movement of the end portion of a sinuous spring inside a receptacle inside the plastic liner secured inside the U-shaped hook portion of the metal clip.

According to another aspect of this invention, the clip assembly comprises a metal clip having a generally planar body portion having two tabs formed therein and a generally planar flange portion extending outwardly from one end of the body portion opposite a U-shaped hook portion. The flange portion has tacks extending outwardly from the flange portion adapted to penetrate the wooden rail. The U-shaped hook portion has two tabs and a detent formed from the material of the metal clip, the detent being located between the two tabs of the U-shaped hook portion. The clip assembly further comprises a plastic liner secured inside the U-shaped hook portion of the metal clip via the tabs formed from the material of the metal clip. The plastic liner lays over the detent to inhibit movement of the end portion of a sinuous spring.

According to another aspect of this invention, the clip assembly comprises a metal clip having a body portion having two tabs formed from the material of the metal clip. The clip assembly further comprises a flange portion extending outwardly from one end of the body portion opposite a U-shaped hook portion. The flange portion has tacks formed from the material of the metal clip. The tacks extend outwardly from the flange portion and are adapted to penetrate the wooden rail. The U-shaped hook portion has two tabs and a detent formed from the material of the metal clip, the detent being located between the two tabs of the U-shaped hook portion. The clip assembly further comprises a plastic liner secured inside the U-shaped hook portion of the metal clip underneath the tabs. The plastic liner overlays the detent to inhibit movement of the end portion of a sinuous spring.

DETAILED DESCRIPTION OF THE DRAWINGS

Figure 1:
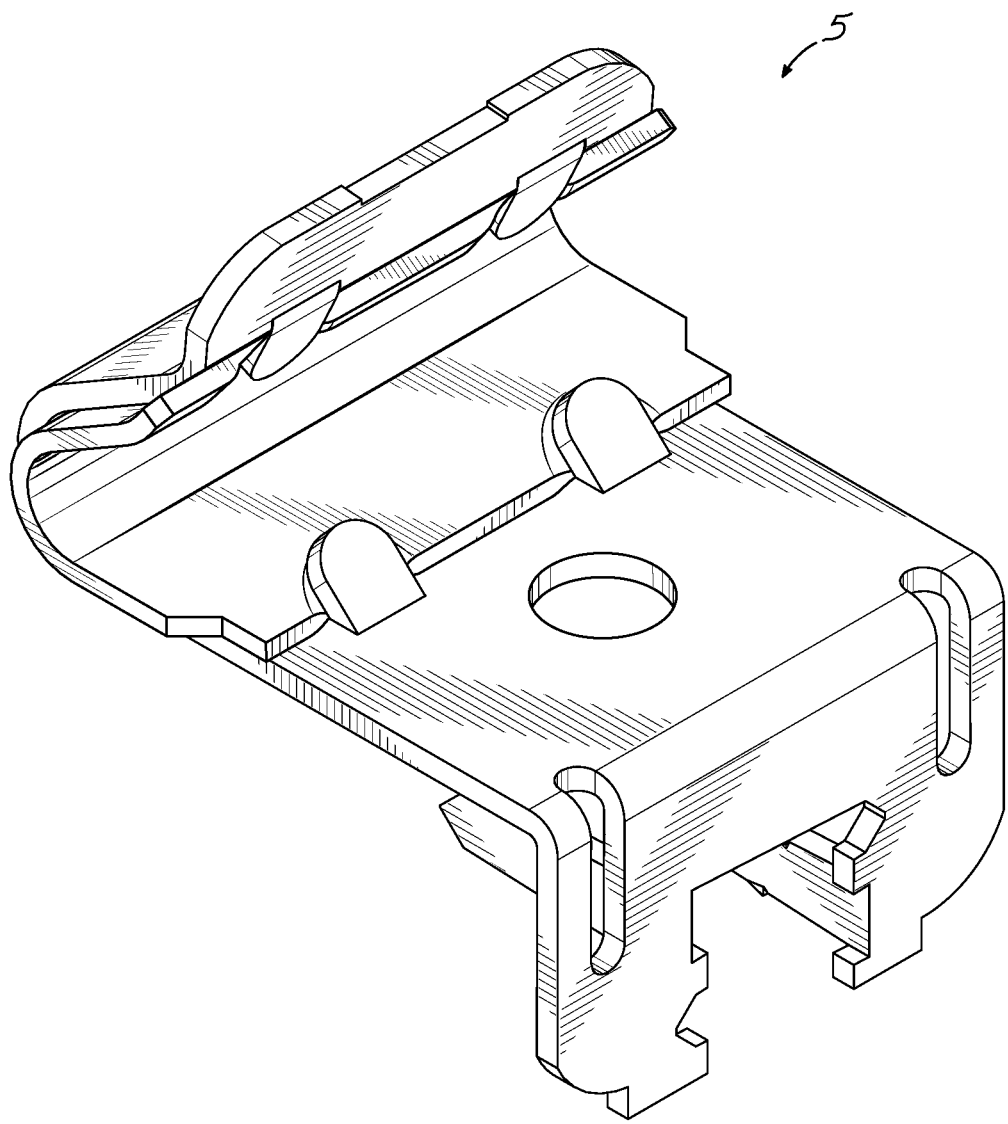
FIG. 1 is a perspective view of a prior art clip assembly.

Referring to the drawings, and particularly to FIG. 1, there is illustrated a prior art clip assembly 5 lacking the detent of the clip assemblies 18, 18', 18a and 18a' of the present invention. One drawback to the prior art clip assembly shown in FIG. 1 is that an end portion of a sinuous spring may move laterally in the U-shaped plastic liner in certain situations and/or may disengage from the clip assembly. The detent of each of the clip assemblies of the present invention helps hold the end portion of a sinuous spring in place, inhibiting lateral movement of the end portion of a sinuous spring.

Figure 2:
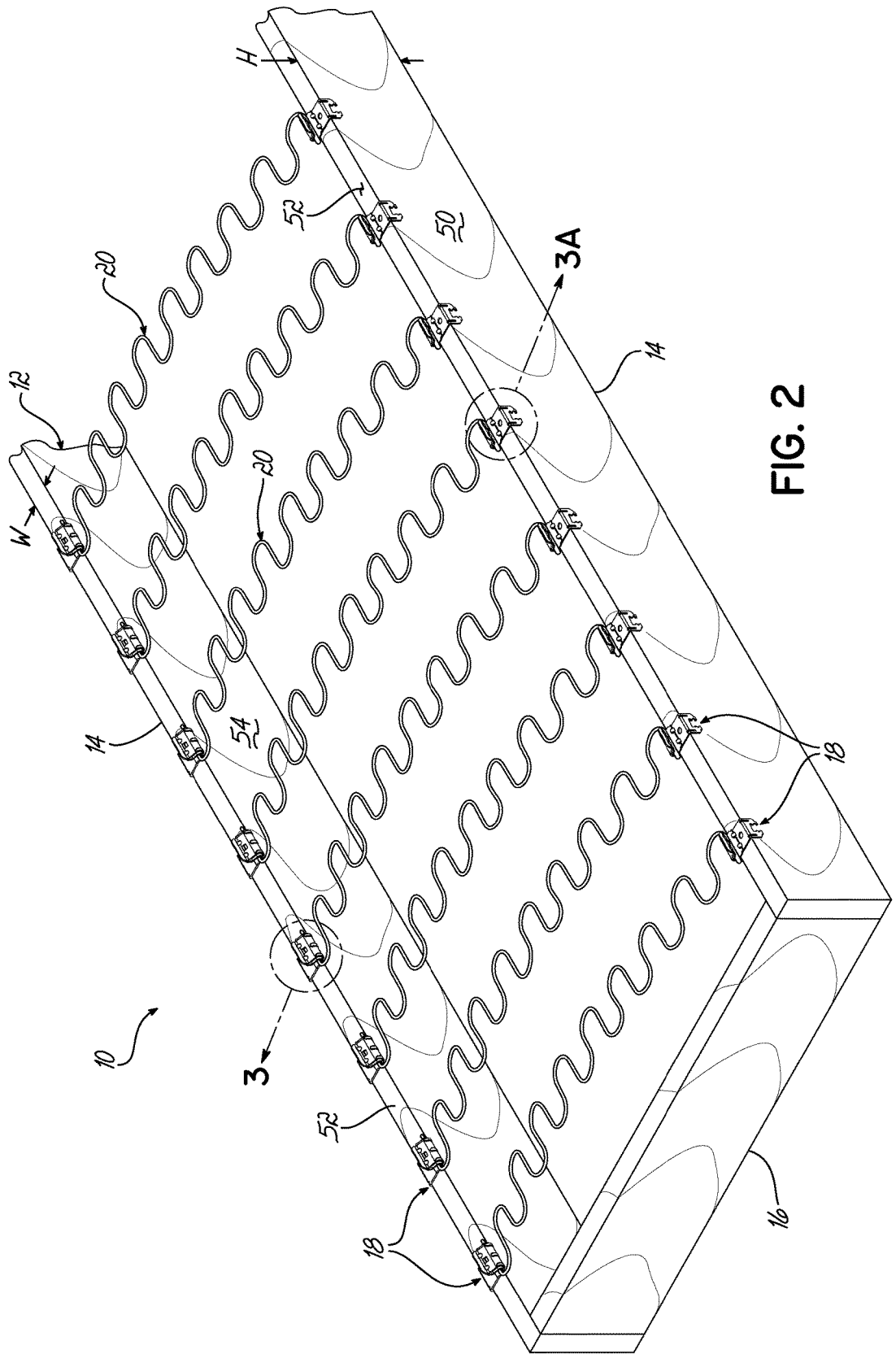
FIG. 2 is a perspective view of a furniture frame and sinuous springs extending from one side to the other side of the frame, clip assemblies in accordance with one embodiment being secured to the frame sides.

FIG. 2 illustrates a portion of a piece of furniture 10 comprising a rectangular frame 12 comprising two side walls 14 and two end walls 16 (only one being shown in FIG. 2). For purposes of this document, the word "furniture" is not intended to be limiting; it may include seats for vehicles, seat cushions or other products. The frame 12 is most commonly made of wood, but may be made of other suitable materials. In the embodiment of frame 12 shown in FIG. 1, each of the side and end walls 14, 16, respectively, is placed on edge with the height "H" being greater than the width "W" of each wall.

As shown in FIG. 2, furniture piece 10 further comprises a plurality of clip assemblies 18 secured to the side walls 14 of the frame 12 in a spaced manner for securing and retaining a plurality of sinuous springs 20. Clip assemblies 18, secured to opposed side walls 14, are aligned to receive and retain end portions 22 of sinuous springs 20 in desired positions and under desired amounts of tension, as shown in FIG. 1. Commonly, such sinuous springs 20 are arched or bowed upwardly to provide resiliency to the furniture piece 10.

Figure 3:
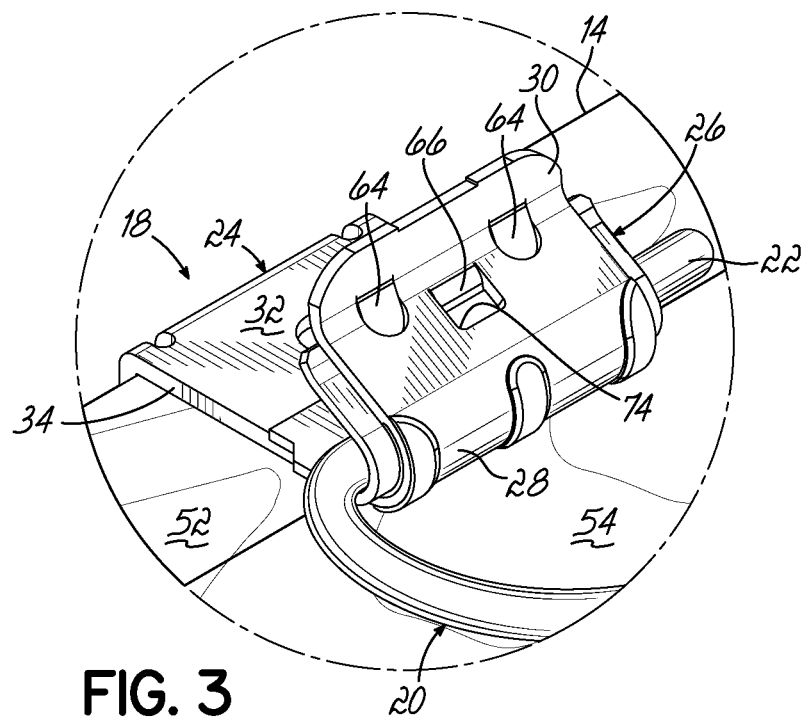
FIG. 3 is an enlarged view of the encircled area 3 of FIG. 2.
Figure 3A:
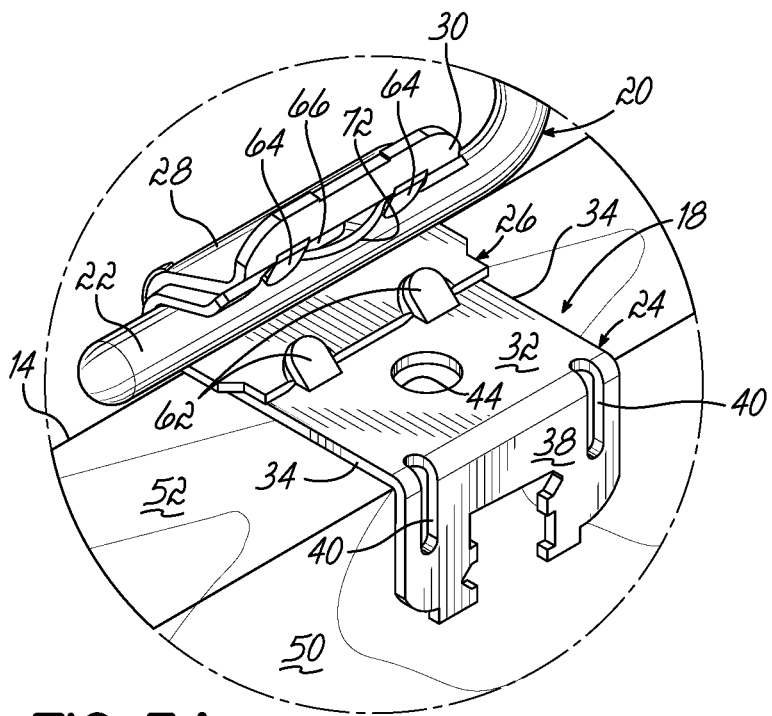
FIG. 3A is an enlarged view of the encircled area 3A of FIG. 2.
Figure 4A:
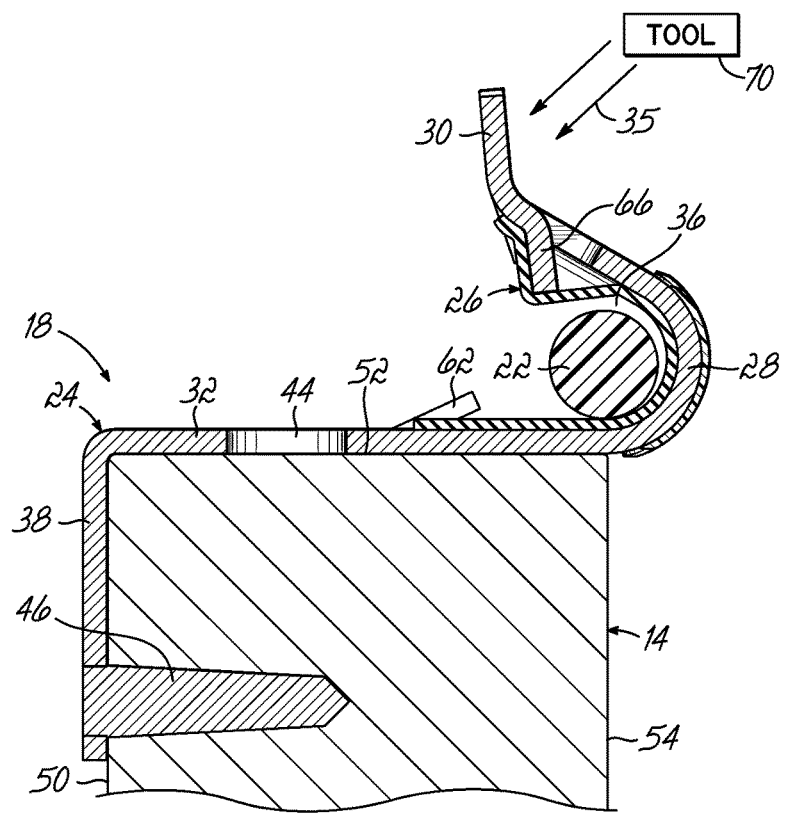
FIG. 4A is a cross-sectional view of the clip assembly of FIGS. 3 and 3A being tightened around an end portion of a sinuous spring.
Figure 4B:
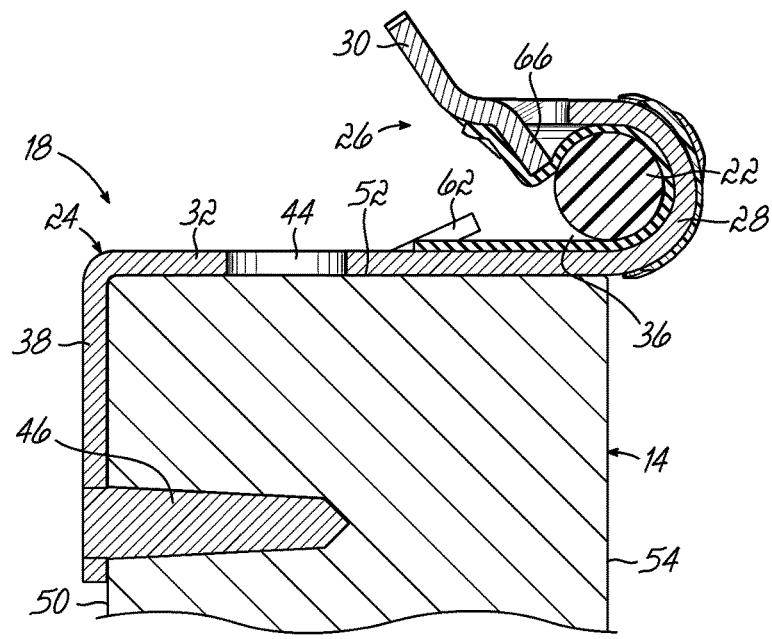
FIG. 4B is a cross-sectional view of the clip assembly of FIG. 4A in a closed position partially surrounding an end portion of a sinuous spring.
Figure 6:
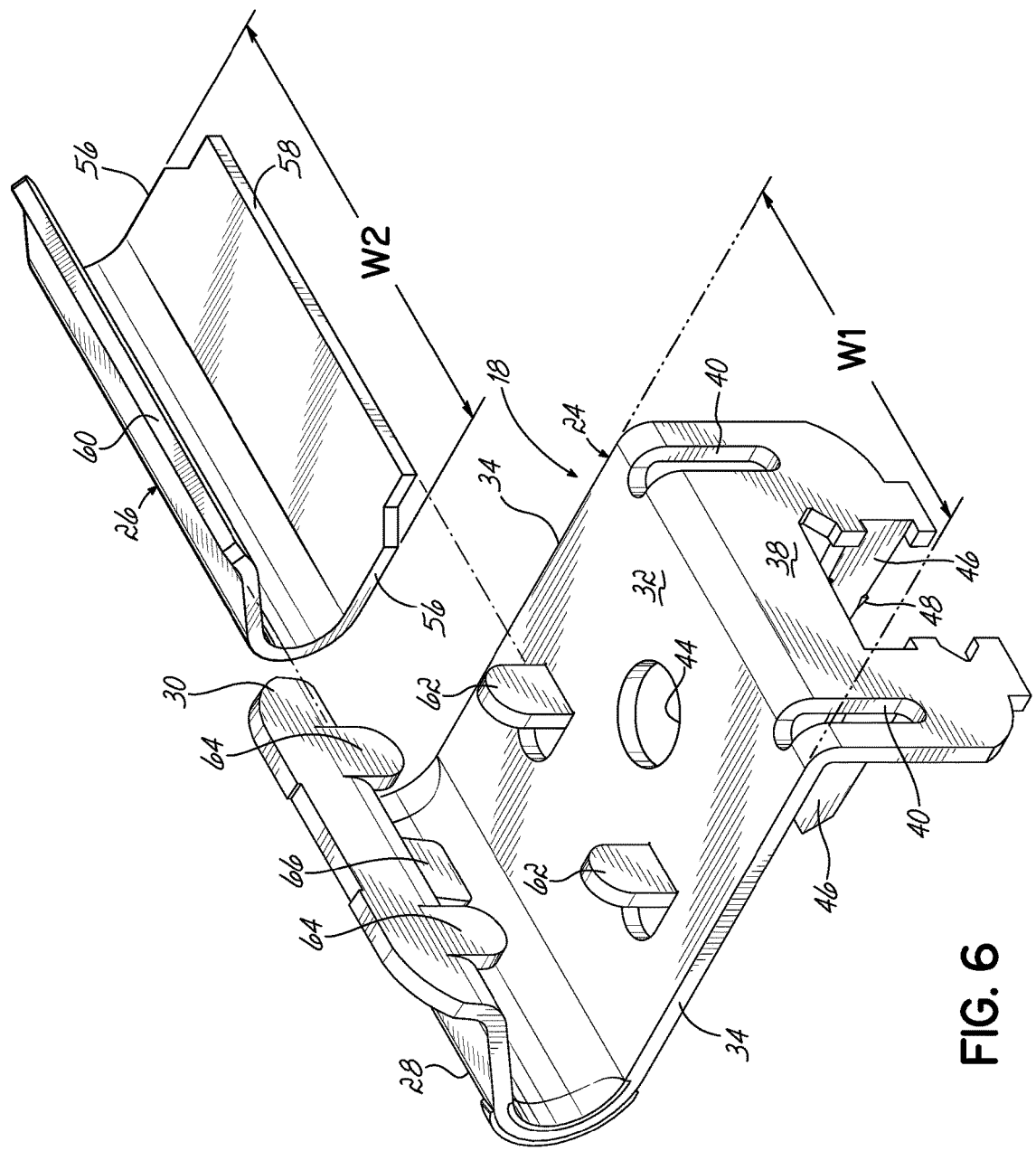
FIG. 6 is a partially disassembled view of the clip assembly of FIG. 5.

FIGS. 3 and 3A each show one of the clip assemblies 18 secured to one of the side walls 14 of frame 12. As best shown in FIG. 6, each clip assembly 18 comprises a first metal piece or clip 24 and a second non-metallic cushioning liner or member 26, usually made of plastic, respectively. As shown in FIGS. 4A and 4B, the pieces 24, 26 are joined together and secured to one of the side walls 14 of the generally rectangular furniture frame 12.

Figure 5:
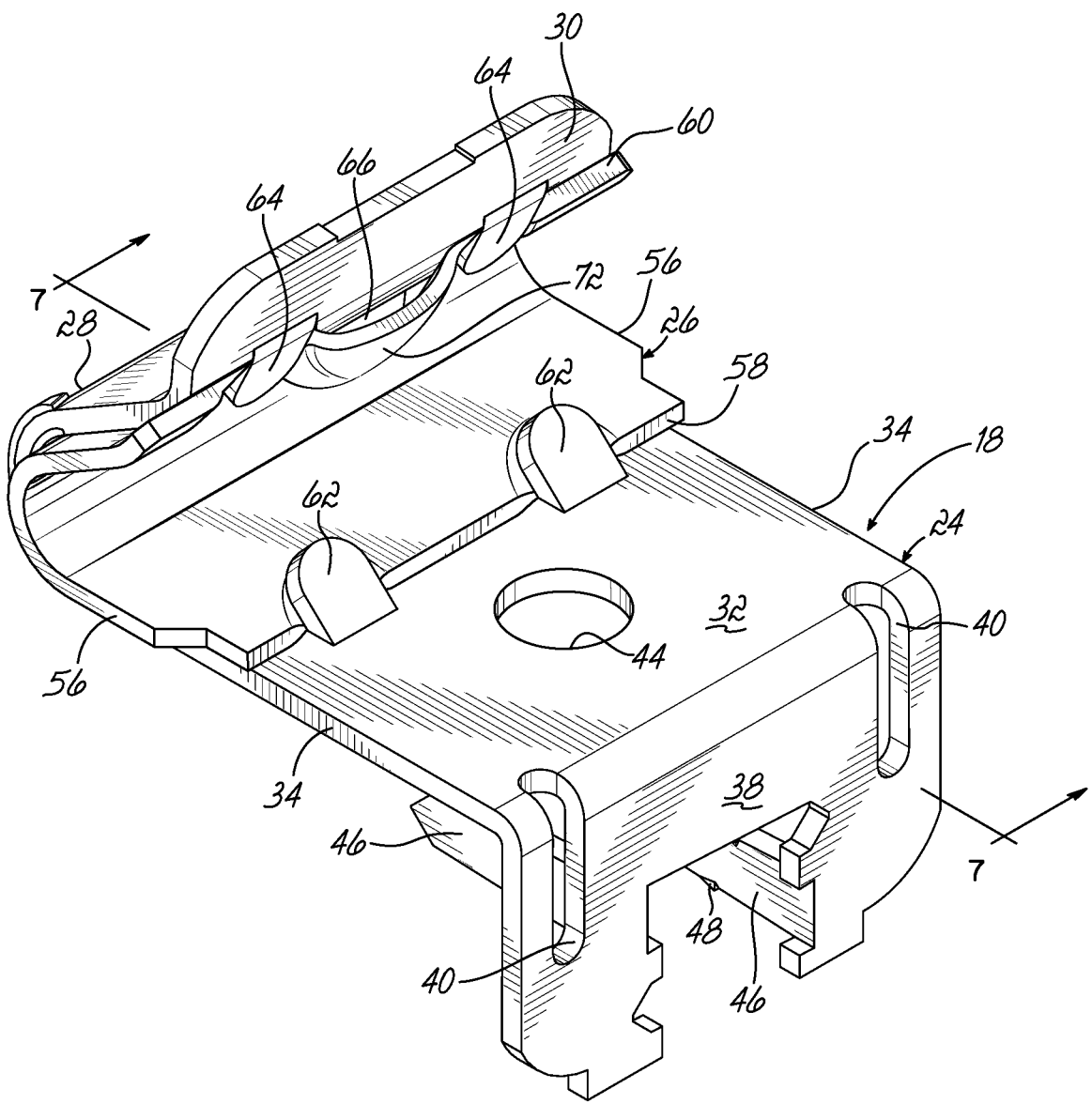
FIG. 5 is an enlarged perspective view of one embodiment of clip assembly.

As best shown in FIGS. 5 and 6, metal clip 24 of clip assembly 18 comprises a U-shaped hook portion 28 adapted to receive and retain an end portion 22 of one of the sinuous springs 20. The U-shaped hook portion 28 of the metal clip 24 has a reverse bend portion 30 at the end thereof. The reverse bend portion 30 may be used to move the U-shaped hook portion 28 from an open position shown in FIG. 4A to a closed position shown in FIG. 4B.

The metal clip 24 further comprises a generally planar body portion 32 which extends from one side edge 34 to the opposed side edge 34 of the metal clip 24 of the clip assembly 18. When the end portion 22 of one of the sinuous springs 20 is inserted into the U-shaped hook portion 28 with the plastic liner 26 therein, a force shown by arrows 35 is applied to the reverse bend portion 30 of the U-shaped hook portion 28 to move the U-shaped hook portion 28 from its open position shown in FIG. 4A to its closed position shown in FIG. 4B. Such force 35 may be exerted by a tool 70, such as a hammer or mallet. In its closed position, the plastic liner 26 inside the U-shaped hook portion 28 of the metal clip 24 better holds or retains the end portion 22 of the sinuous spring 20 in a receptacle 36, illustrated in FIGS. 4A and 4B.

Figure 8:
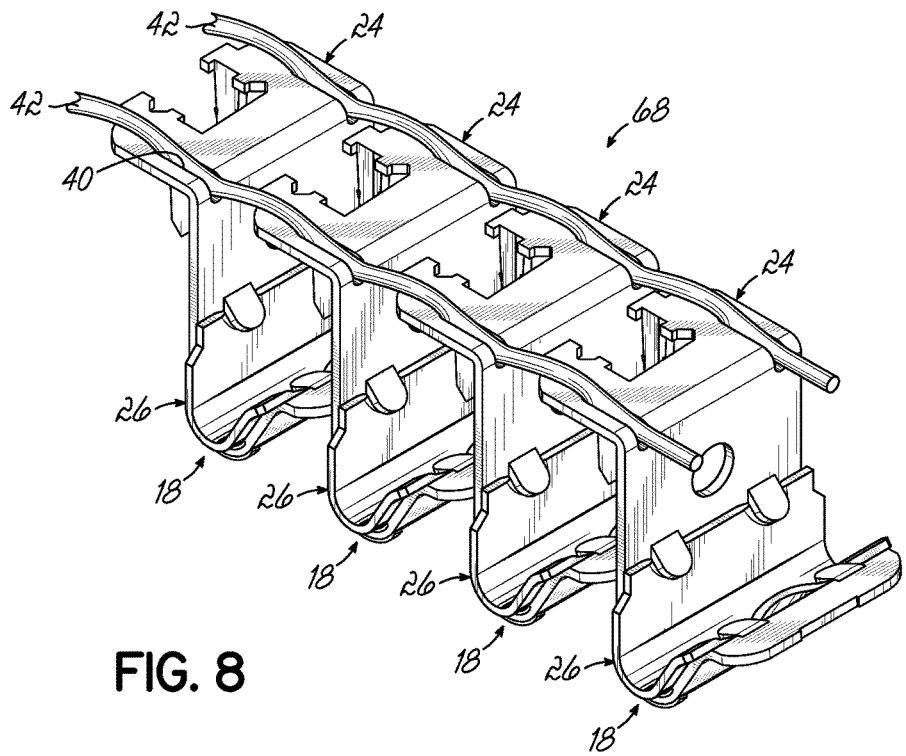
FIG. 8 is a perspective view of a portion of a collated string of clip assemblies of FIG. 5.
Figure 9:
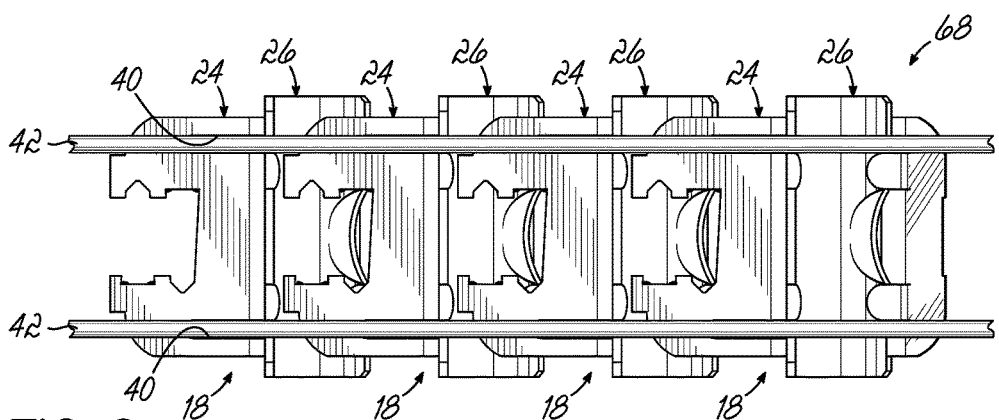
FIG. 9 is a top plan view of the portion of the collated string of clip assemblies of FIG. 8.
Figure 10:
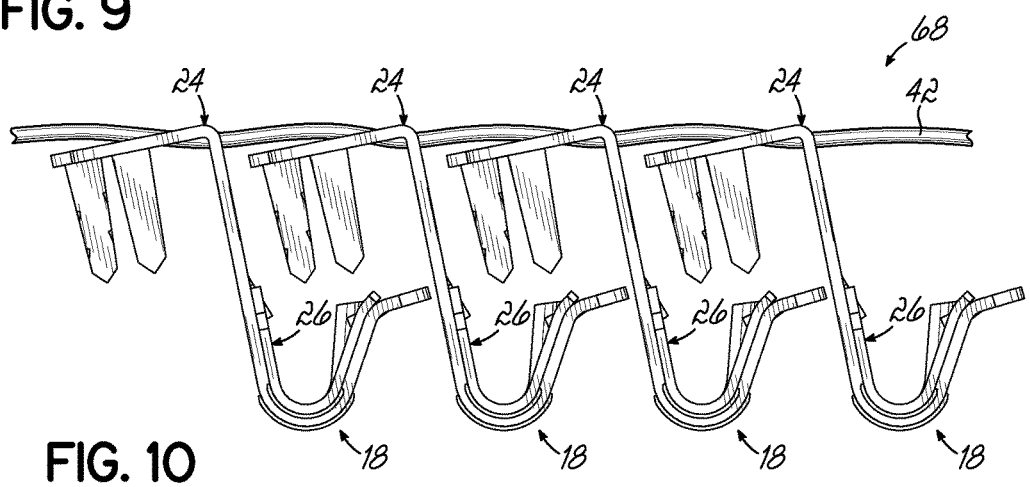
FIG. 10 is a side elevational view of the portion of the collated string of clip assemblies of FIG. 8.

The metal clip 24 of clip assembly 18 further comprises a generally planar flange portion 38 extending outwardly from the end of the body portion 32 opposite the U-shaped hook portion 28 in a direction generally orthogonal or perpendicular to the body portion 32. As best shown in FIG. 3A, the flange portion 38 of the metal clip 24 of clip assembly 18 has a pair of spaced grooves 40 adapted to receive non-metallic connectors 42 which connect multiple clip assemblies 18 together, as shown in FIGS. 8-10.

As best shown in FIG. 3A, the flange portion 38 of the metal clip 24 of clip assembly 18 has an opening 44 extending through the thickness of the flange portion 38 of the metal clip 24 of clip assembly 18. The opening 44 is for manufacturing purposes and may not affect the functionality of the clip assembly 18.

As best shown in FIG. 6, the metal clip 24 of clip assembly 18 has a pair of tacks 46 extending downwardly from the flange portion 38 of the metal clip 24 of clip assembly 18. Each of the tacks 46 is formed from the metal material of the flange portion 38 of the metal clip 24 of clip assembly 18. The tacks 46 of the first piece 24 of clip assembly 18 are located and sized to be inserted into one of the side walls 14 of the generally rectangular furniture frame 12. Although the drawings show tacks 46 of a certain size, the drawings are not intended to be limiting. The tacks 46 may be a different size than shown.

Figure 7:
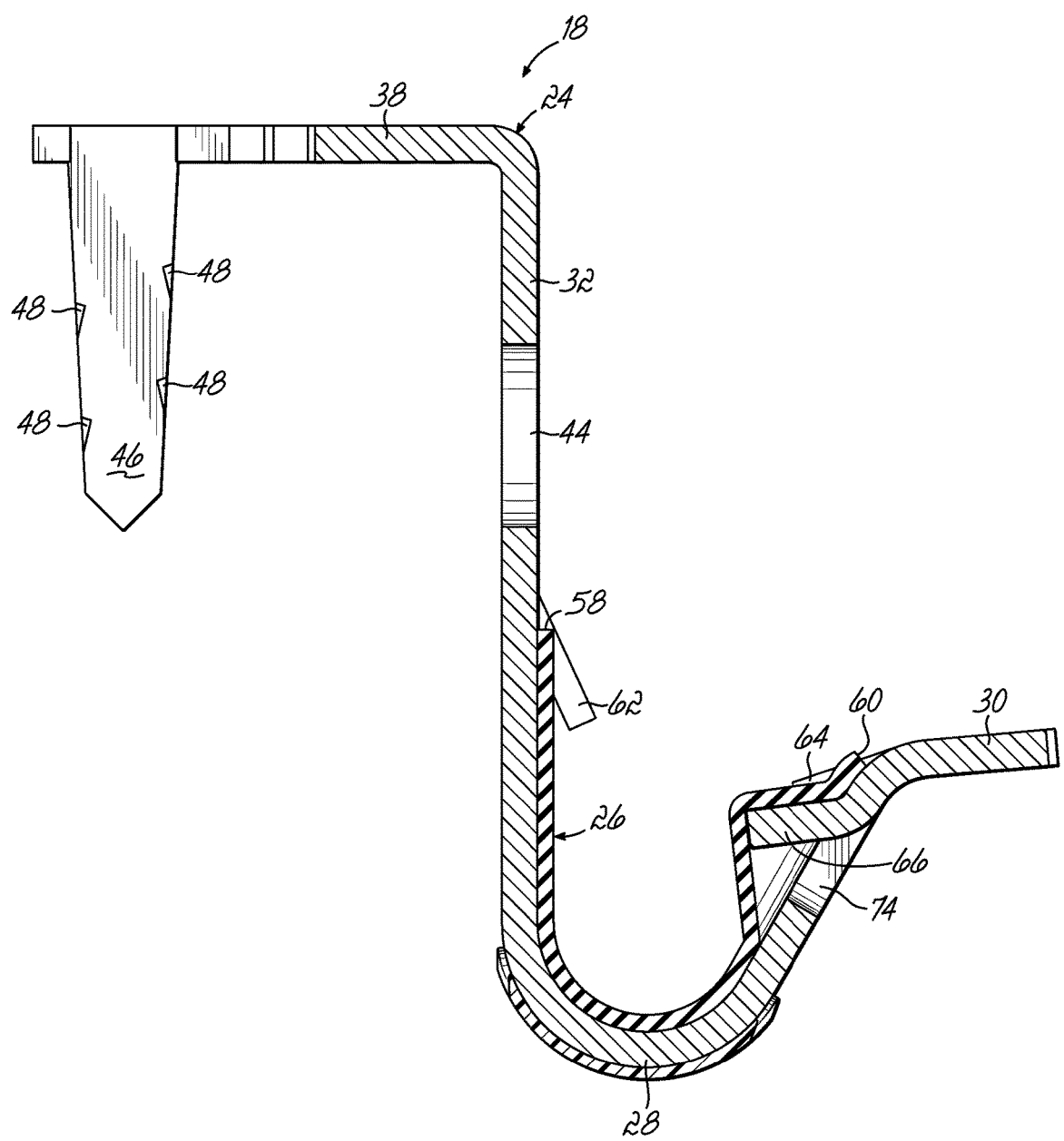
FIG. 7 is a cross-sectional view of the clip assembly taken along the line 7-7 of FIG. 5.

As best shown in FIG. 7, each of the tacks 46 of the first metal piece 24 of clip assembly 18 also has a plurality of vertically spaced teeth 48 on an inside surface thereof to improve the holding strength of the clip assembly 18 to the wooden furniture frame 12. Although the drawings show both tacks 46 having teeth 48 on an inside surface thereof, one or both of the tacks may have a different number of teeth, teeth of a different configuration than shown, teeth on an outside surface thereof or teeth on both surfaces. Alternatively, one or both tacks may have no teeth and smooth inside and outside surfaces.

As best illustrated in FIGS. 2, 3 and 3A, the tacks 46 of the metal clip 24 of clip assembly 18 are secured inside one of the side walls 14 of furniture frame 12 with either an automated/mechanical machine or hand-held tool. When secured in place, the flange portion 38 of the metal clip 24 of clip assembly 18 contacts or abuts an outer side surface 50 of one of the side walls 14 of furniture frame 12, and the body portion 32 of the metal clip 24 of clip assembly 18 contacts or abuts an upper end surface 52 of one of the side walls 14 of furniture frame 12. As best shown in FIG. 2, the U-shaped hook portion 28 of the metal clip 24 of clip assembly 18 is located generally above the inside side surface 54 of one of the side walls 14 of furniture frame 12.

The second non-metallic cushioning liner or member 26 of clip assembly 18 comprises a plastic liner made of polypropylene, which is generally planar when laid flat. However, the plastic liner may be made of any plastic material. The plastic liner 26 of clip assembly 18 has opposed side edges 56, the linear distance between which defines a width W2 greater than the width W1 of the metal clip 24 of the clip assembly 18. The plastic liner 26 of clip assembly 18 also has a front or first edge 58 and a rear or second edge 60. As best shown in FIG. 5, the plastic liner 26 of clip assembly 18 is secured in the U-shaped hook portion 28 of the metal clip 24 of clip assembly 18 with four tabs 62, 64 formed from the material of the metal clip 24. More specifically, two of the tabs 62 are formed from the material of the body portion 32 of the metal clip 24, and the other two tabs 64 are formed from the material of the U-shaped hook portion 28 of the metal clip 24. As best shown in FIG. 5, tabs 62 lay over the front or first edge 58 of the plastic liner 26 of clip assembly 18, and tabs 64 lay over the rear or second edge 60 of the plastic liner 26 of clip assembly 18. One purpose of the plastic liner 26 is to prevent noise caused by an end portion 22 of a sinuous spring 20 directly contacting the metal clip 24 of clip assembly 18, thereby avoiding metal-to-metal contact. Another purpose of the plastic liner 26 is to secure an end portion 22 of a sinuous spring 20 in place in the U-shaped hook portion 28 of the metal clip 24, thereby preventing the end portion 22 of a sinuous spring 20 from disengaging from the clip assembly 18.

As best shown in FIG. 6, a detent 66 extends outwardly from the U-shaped hook portion 28 of the metal clip 24 of clip assembly 18. The detent 66 is formed from the metal material of the metal clip 24 and creates an opening 74 in the U-shaped hook portion 28 of the metal clip 24 after being extended. See FIG. 3. The plastic liner 26 inside the U-shaped hook portion 28 of the metal clip 24 lays over the detent 66, thereby creating a bow or curved portion 72 in the plastic liner 26, as best shown in FIGS. 5 and 7. As best shown in FIGS. 4A and 4B, the detent 66 forces the plastic liner 26 to further surround an end portion 22 of a sinuous spring 20 after a force indicated by arrows 35 is exerted upon the reverse bend portion 30 of the U-shaped hook portion 28 of metal clip 24. With the plastic liner 26 further surrounding the end portion 22 of a sinuous spring 20, the end portion 22 of sinuous spring 20 is less apt to move laterally or move at all. The increased stability of the end portion 22 of the sinuous spring 20, resulting from the bow or curved portion 72 in the plastic liner 26 due to the detent 66, further prevents noise or squeaking, resulting in a superior, longer lasting clip assembly and piece of furniture.

FIG. 8 shows four clip assemblies 18 aligned in a similar orientation and having the flange portion 34 of the metal clip 24 of clip assembly 18 contacting or proximate the body portion 32 of the metal clip 24 of an adjacent clip assembly 18. When the clip assemblies are juxtaposed in such a manner, the grooves 40 of each clip assembly 18 are co-linearly aligned to permit a flexible connector 42 to be inserted into each of the aligned grooves 40 and extend the length of the aligned clip assemblies 18. As best shown in FIGS. 8-10, the two flexible connectors 42 are pinched or sandwiched inside the grooves 40 of each clip assembly 18, each flexible connector 42 being inside a plurality of aligned grooves 40 of multiple clip assemblies 18.

Although FIGS. 8-10 show four clip assemblies 18 aligned in a string 68 of aligned collated clip assemblies 18, the string 68 of aligned collated clip assemblies 18 may be made of any number of clip assemblies 18 connected together. In each of the aligned collated clip assemblies 18, the connectors 42 are pinched or sandwiched inside the grooves 40 of each collated clip assembly 18.

The connectors 42 used to interconnect adjacent aligned clip assemblies 18 into a string 68 are preferably fabricated from a plastic material, such as a low or high density polyethylene or polyester plastic. The connectors 42 provide flexibility in the collated string 68 of clip assemblies 18, which is needed when the string 68 is bent and rolled into a spool for insertion into a clinching tool. The connectors 42 have the required tensile strength to withstand pulling and twisting forces without breaking. Also, when a last clip assembly is cut off from the string 68, there are no sharp or jagged barbs left over to injure workers or tear fabric covering the clipped wires.

Figure 3B:
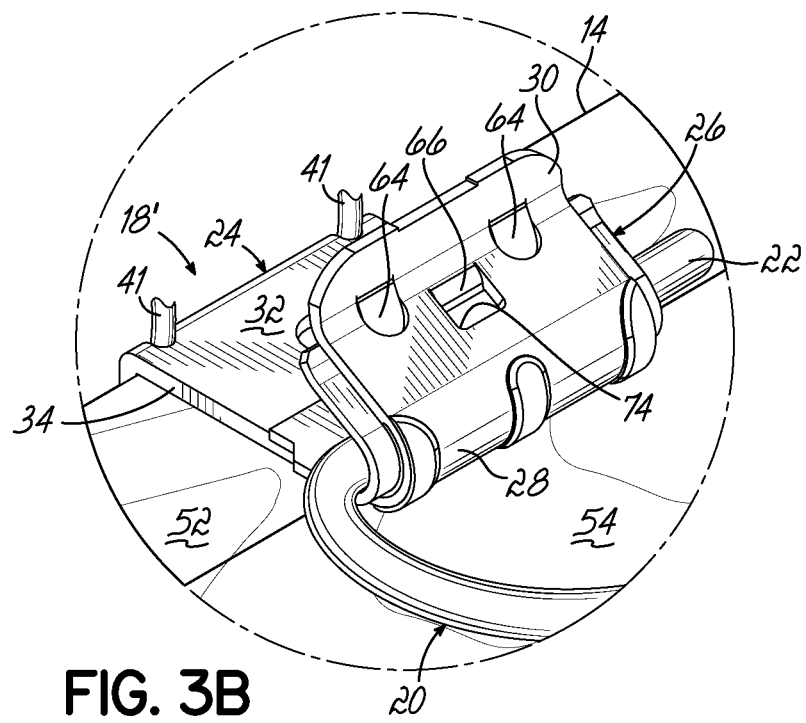
FIG. 3B is an enlarged view like the encircled area 3 showing pieces of connector secured to the clip assembly.
Figure 3C:
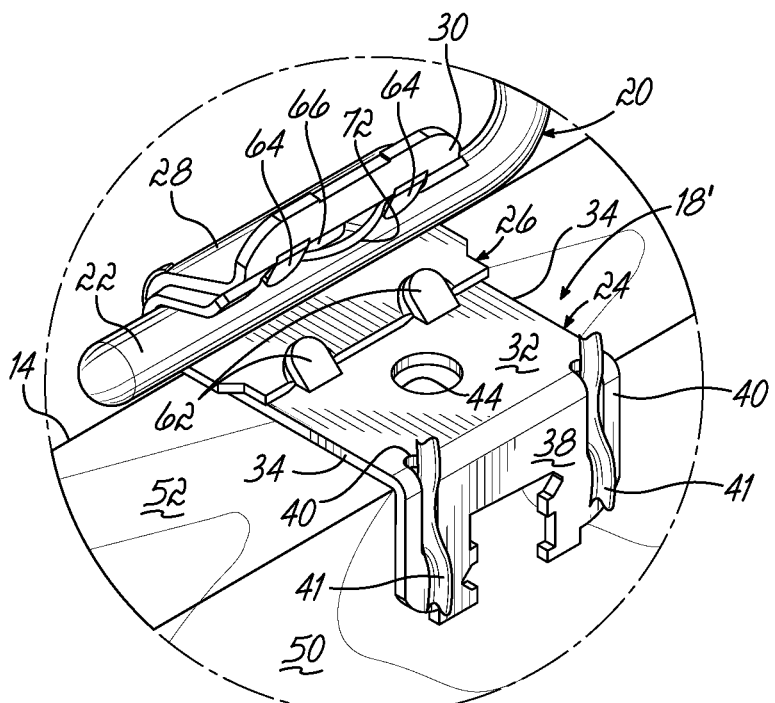
FIG. 3C is an enlarged view like the encircled area 3A showing pieces of connector secured to the clip assembly.

When used in a clipping tool, the connectors 42 may be broken between adjacent clip assemblies 18 in the collated string 68 of clip assemblies 18, leaving portions 41 of the connectors 42 with the clip assembly 18 secured to the frame 12. FIGS. 3B and 3C illustrate two such clip assemblies 18', each clip assembly 18' having portions 41 of the connectors 42 still with the clip assembly 18' when the clip assembly 18' is secured to one of the side walls 14 of frame 12.

Figure 11:
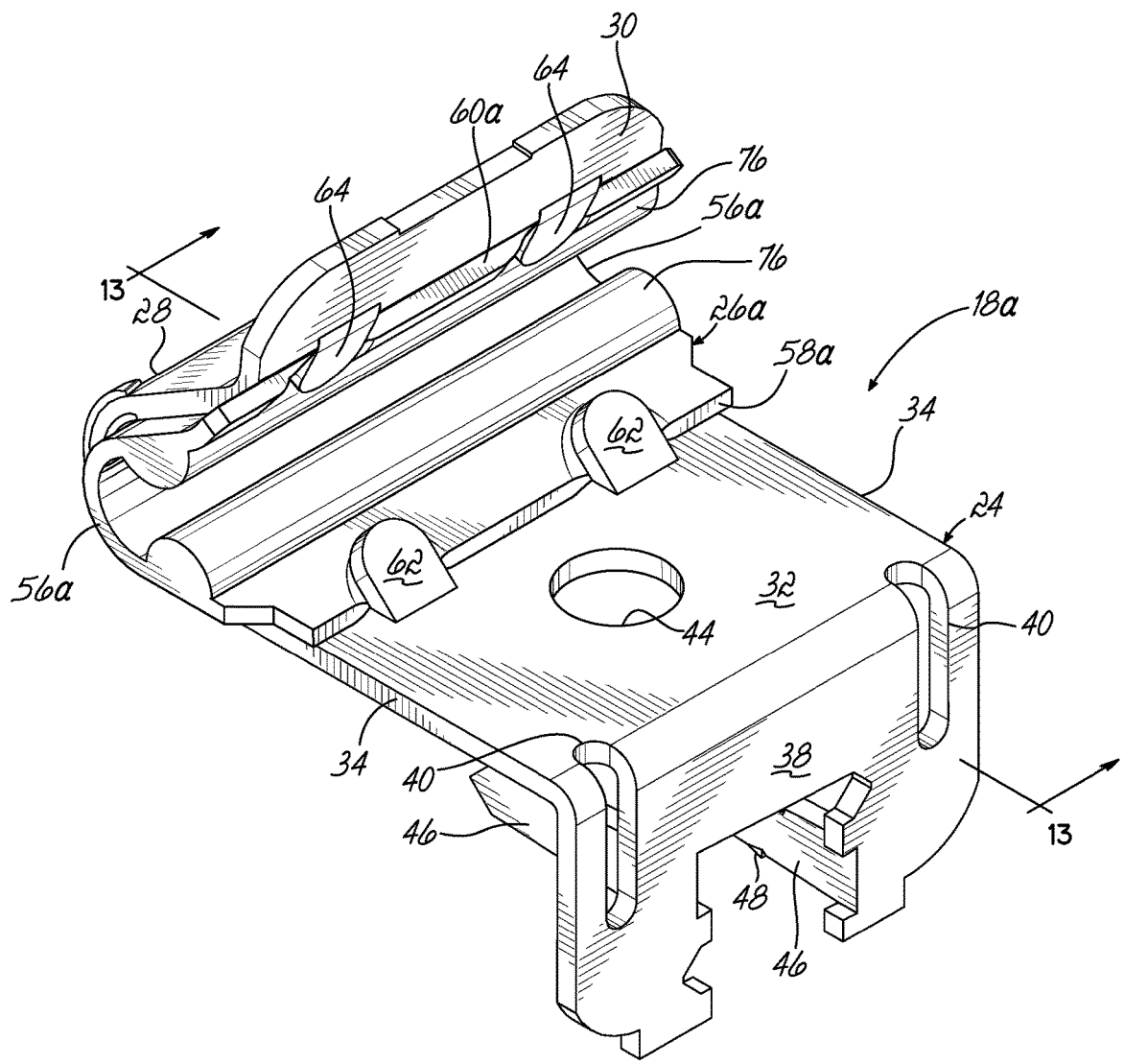
FIG. 11 is an enlarged perspective view of an alternative embodiment of clip assembly.

FIG. 11 illustrates an alternative embodiment of clip assembly 18a having the same first piece or metal clip 24 as the clip assembly 18 shown herein and described above. However, in clip assembly 18a, the second piece or plastic liner 26a is different than the plastic liner 26 shown herein and described above. Although FIGS. 11-17 illustrate the plastic liner 26a being used with a metal clip 24, the plastic liner 26a may be used in conjunction with a prior art metal clip like the one shown in FIG. 1 lacking any detent.

As best shown in FIG. 11, the plastic liner 26a has two bumps 76, each bump 76 extending from one side edge 56a to the other side edge 56a. The linear distance between the side edges 56a defines a width W2 greater than the width W1 of the metal clip 24 of the clip assembly 18a. The plastic liner 26a of clip assembly 18a also has a front or first edge 58a and a rear or second edge 60a. As best shown in FIG. 11, the plastic liner 26a of clip assembly 18a is secured in the U-shaped hook portion 28 of the metal clip 24 of clip assembly 18a with four tabs 62, 64 formed from the material of the metal clip 24. More specifically, two of the tabs 62 are formed from the material of the body portion 32 of the metal clip 24, and the other two tabs 64 are formed from the material of the U-shaped hook portion 28 of the metal clip 24. As best shown in FIG. 11, tabs 62 lay over the front or first edge 58a of the plastic liner 26a of clip assembly 18a and tabs 64 lay over the rear or second edge 60a of the plastic liner 26 of clip assembly 18a. One purpose of the plastic liner 26a is to prevent noise from an end portion 22 of a sinuous spring 20 from directly contacting the metal clip 24 of clip assembly 18a, thereby avoiding metal-to-metal contact. Another purpose of the plastic liner 26a is to secure an end portion 22 of a sinuous spring 20 in place in the U-shaped hook portion 28 of the metal clip 24, thereby preventing the end portion 22 of a sinuous spring 20 from disengaging from the clip assembly 18a.

Figure 13:
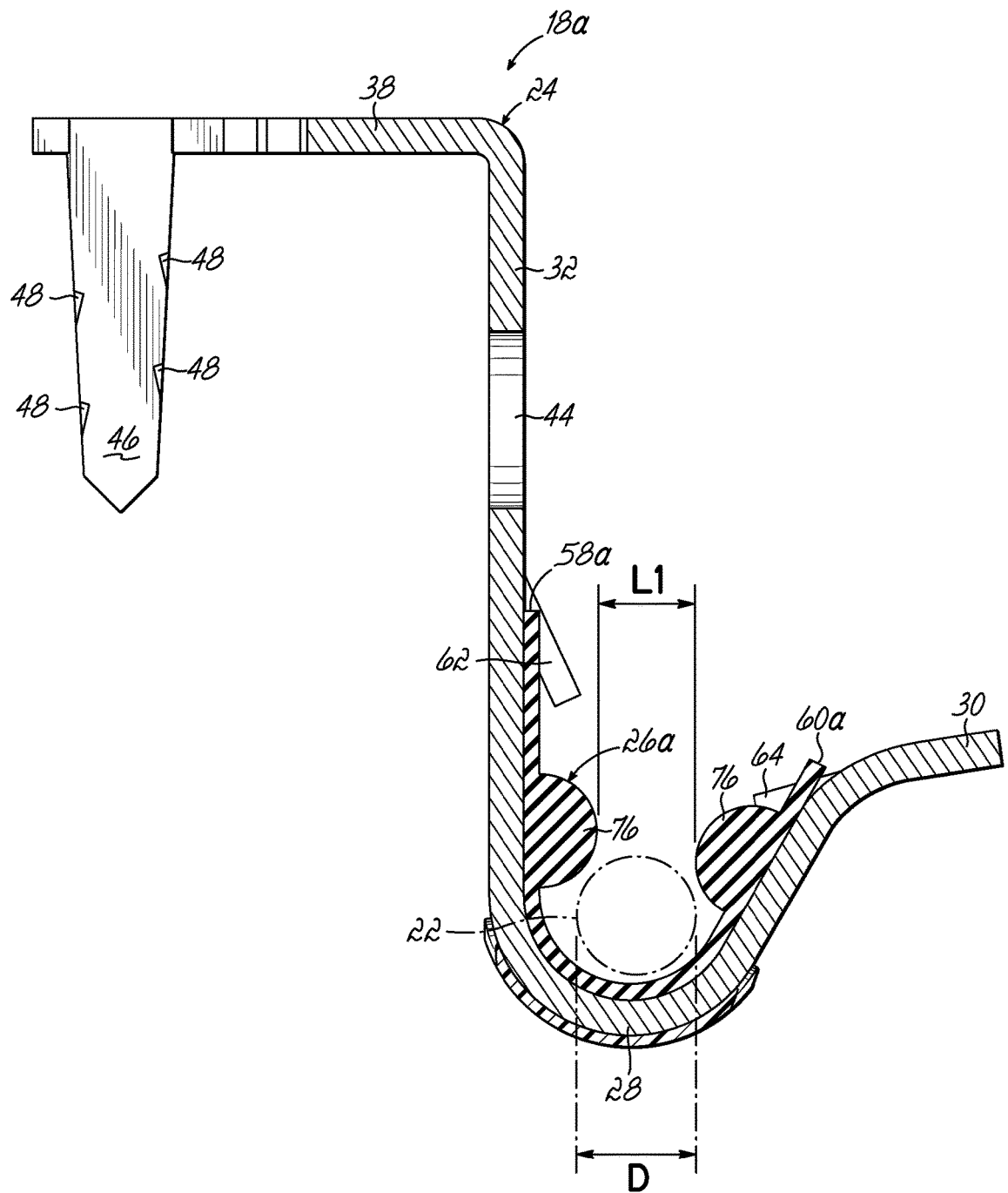
FIG. 13 is a cross-sectional view of the clip assembly taken along the line 13-13 of FIG. 11.

As shown in FIG. 13, the purpose of the bumps 76 of the plastic liner 26a is to secure an end portion 22 of a sinuous spring 20 in place in the U-shaped hook portion 28 of the metal clip 24 without the need for a tool to further bend the metal clip 24. The bumps 76 prevent the end portion 22 of a sinuous spring 20 from disengaging from the clip assembly 18a when outside forces are applied to the sinuous spring, such as when someone sits on a couch. As shown in FIG. 13, when the plastic liner 26a is secured inside the U-shaped hook portion 28 of the metal clip 24 with tabs 62, 64 as described above, the linear distance L1 between the bumps 76 of the plastic liner 26a is less than the diameter D of an end portion 22 of a sinuous spring 20. The location of the bumps 76 of the plastic liner 26a relative to the end portion 22 of a sinuous spring 20 prevents the end portion 22 of a sinuous spring 20 from disengaging from the clip assembly 18a.

Figure 14A:
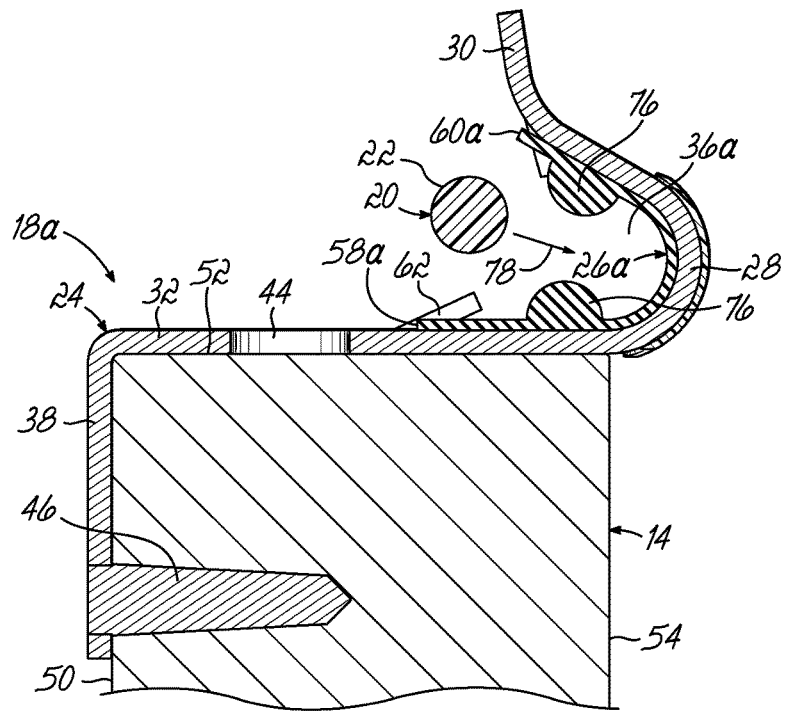
FIG. 14A is a cross-sectional view of the clip assembly of FIG. 11, an end portion of a sinuous spring being inserted into the receptacle of the clip assembly.
Figure 14B:
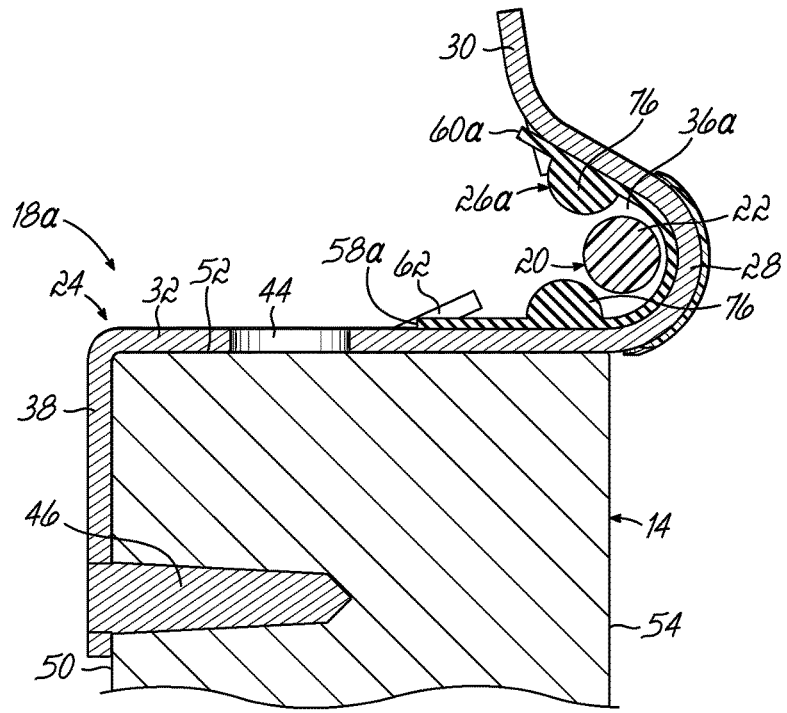
FIG. 14B is a cross-sectional view of the clip assembly of FIG. 14A, an end portion of a sinuous spring being secured in the receptacle of the clip assembly.

FIGS. 14A and 14B illustrate a method of securing an end portion 22 of a sinuous spring 20 inside a clip assembly 18a. As shown in FIG. 14A, the end portion 22 of one of the sinuous springs 20 is inserted between the bumps 76 of the plastic liner 26a secured inside the U-shaped hook portion 28 of the metal clip 24 by a force being applied in the direction shown by arrow 78. Due to the linear distance L1 between bumps 76 of the plastic liner 26a being less than the diameter D of the end portion 22 of a sinuous spring 20, a force must be exerted in the direction of arrow 78 to force the end portion 22 of the sinuous spring 20 into a receptacle 36a. Unlike the clip assembly 18 described above, the U-shaped hook portion 28 of metal clip 24 does not move during the insertion process. As shown in FIG. 14B, the end portion 22 of one of the sinuous springs 20 remains inside the receptacle 36a due to the location of the bumps 76 of the plastic liner 26a. Due to its unique configuration, the plastic liner 26a secured inside the U-shaped hook portion 28 of the metal clip 24 better holds or retains an end portion 22 of a sinuous spring 20 in a receptacle 36a, illustrated in FIGS. 14A and 14B.

Figure 15:
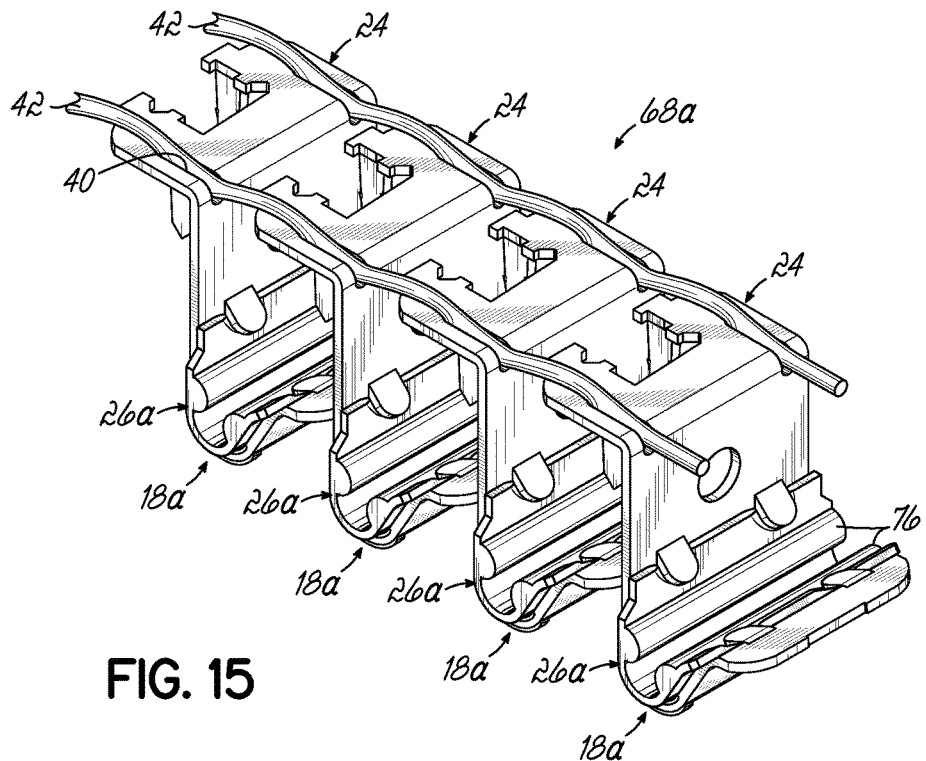
FIG. 15 is a perspective view of a portion of a collated string of clip assemblies of FIG. 11.
Figure 16:
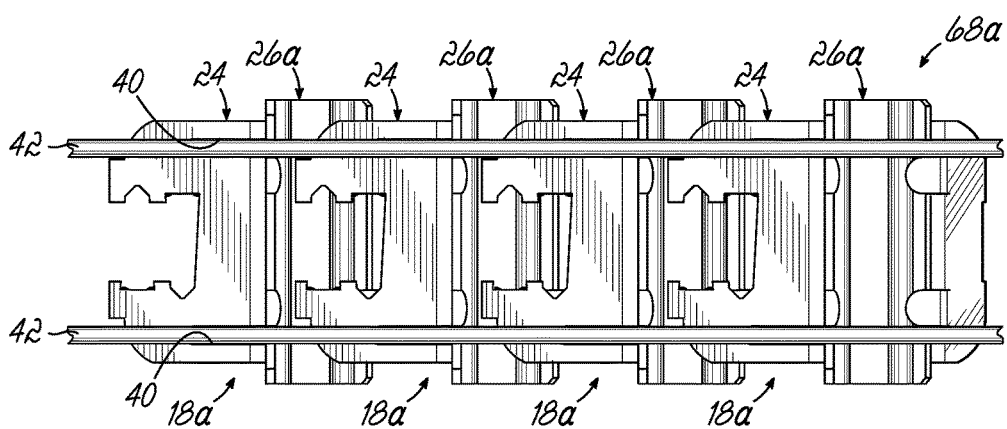
FIG. 16 is a top plan view of the portion of the collated string of clip assemblies of FIG. 15.
Figure 17:
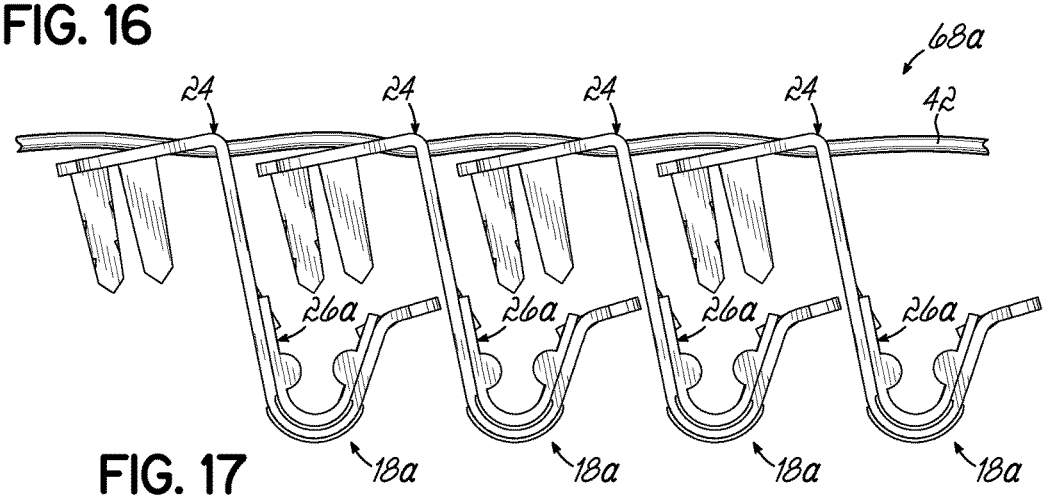
FIG. 17 is a side elevational view of the portion of the collated string of clip assemblies of FIG. 15

FIG. 15 shows four clip assemblies 18a aligned in a similar orientation and having the flange portion 34 of the metal clip 24 of clip assembly 18a contacting or proximate the body portion 32 of the metal clip 24 of an adjacent clip assembly 18a. When the clip assemblies are juxtaposed in such a manner, the grooves 40 of each clip assembly 18a are co-linearly aligned to permit a flexible connector 42 to be inserted into each of the aligned grooves 40 and extend the length of the aligned clip assemblies 18a. As best shown in FIGS. 15-17, the two flexible connectors 42 are pinched or sandwiched inside the grooves 40 of each clip assembly 18a, each flexible connector 42 being inside a plurality of aligned grooves 40 of multiple clip assemblies 18a.

Although FIGS. 15-17 show four clip assemblies 18a aligned in a string 68a of aligned collated clip assemblies 18a, the string 68a of aligned collated clip assemblies 18a may be made of any number of clip assemblies 18a connected together. In each of the aligned collated clip assemblies 18a, the connectors 42 are pinched or sandwiched inside the grooves 40 of each collated clip assembly 18a.

The connectors 42 used to interconnect adjacent aligned clip assemblies 18a into a string 68a are preferably fabricated from a plastic material, such as a low or high density polyethylene or polyester plastic. The connectors 42 provide flexibility in the collated string 68a of clip assemblies 18a, which is needed when the string 68a is bent and rolled into a spool for insertion into a clinching tool. The connectors 42 have the required tensile strength to withstand pulling and twisting forces without breaking. Also, when a last clip assembly is cut off from the string 68a, there are no sharp or jagged barbs left over to injure workers or tear fabric covering the clipped wires.

Figure 11A:
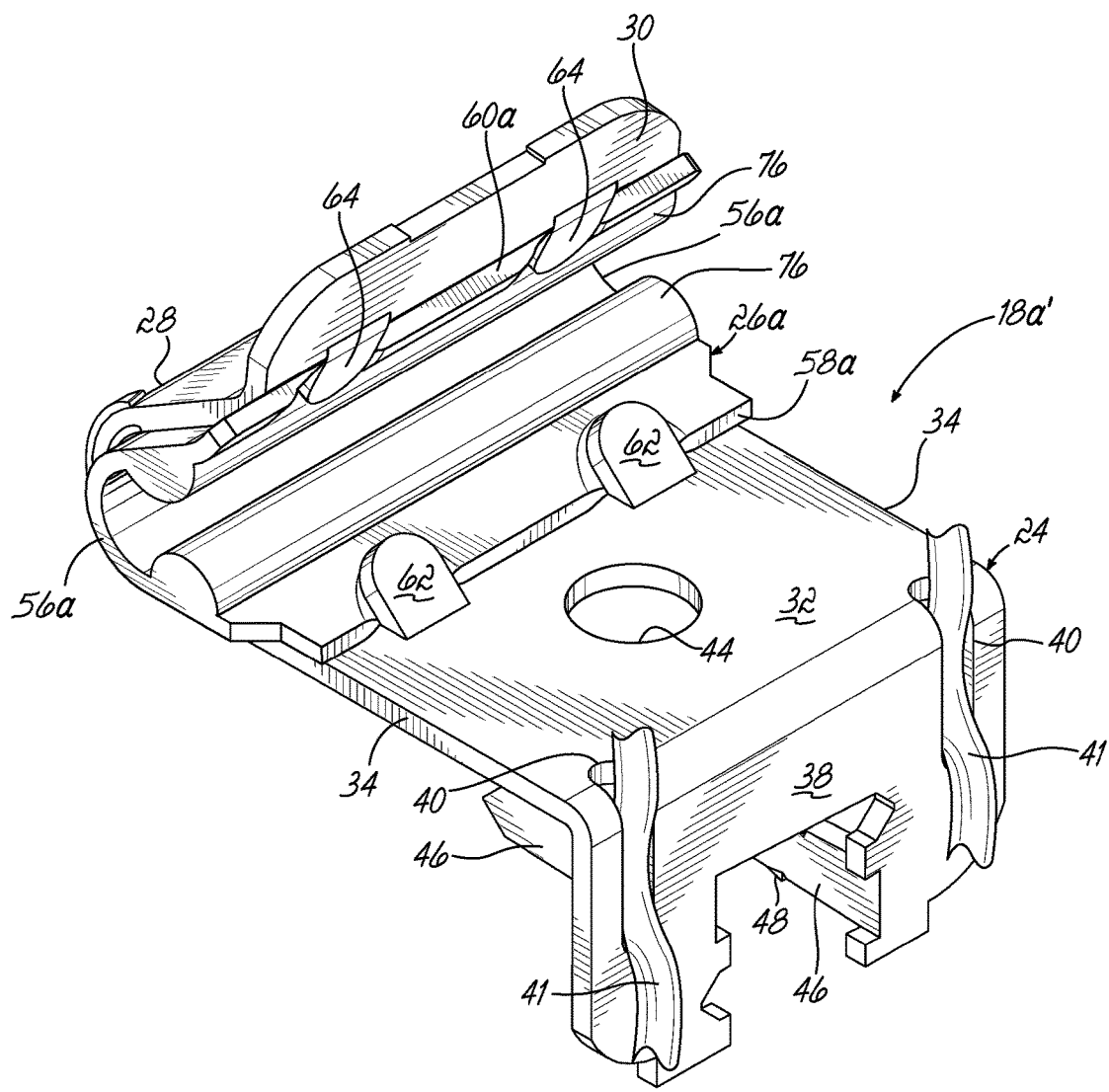
FIG. 11A is an enlarged perspective view of the clip assembly of FIG. 11 showing pieces of connector secured to the clip assembly.
Figure 12:
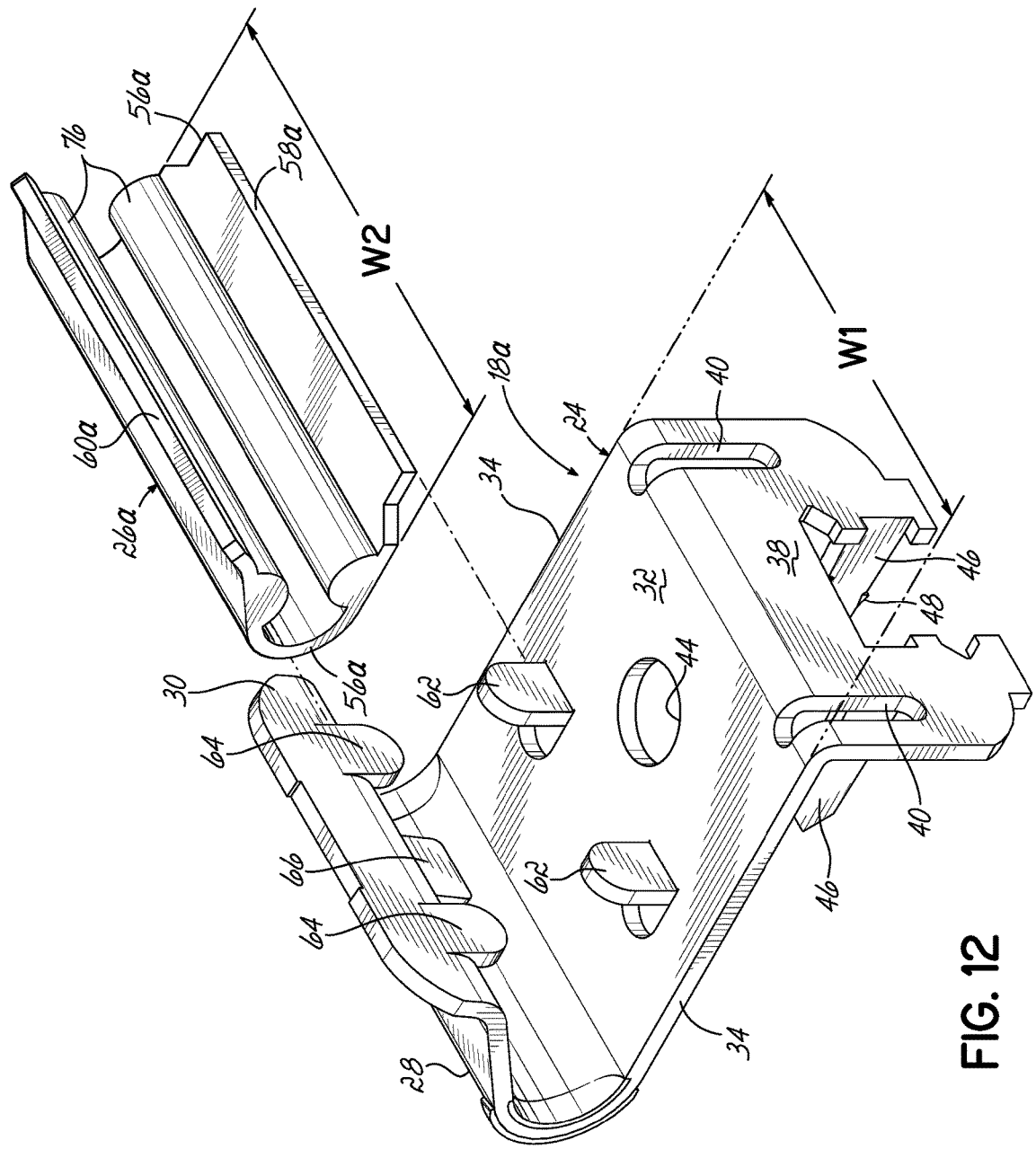
FIG. 12 is a partially disassembled view of the clip assembly of FIG. 11.

When used in a clipping tool, the connectors 42 may be broken between adjacent clip assemblies 18a in the collated string 68a of clip assemblies 18a, leaving portions 41 of the connectors 42 with the clip assembly 18a secured to the frame 12. FIG. 11A illustrates two such clip assemblies 18a', each clip assembly 18a' having portions 41 of the connectors 42 still with the clip assembly 18a' when the clip assembly 18a' is secured to one of the side walls 14 of frame 12.

Figure 18:
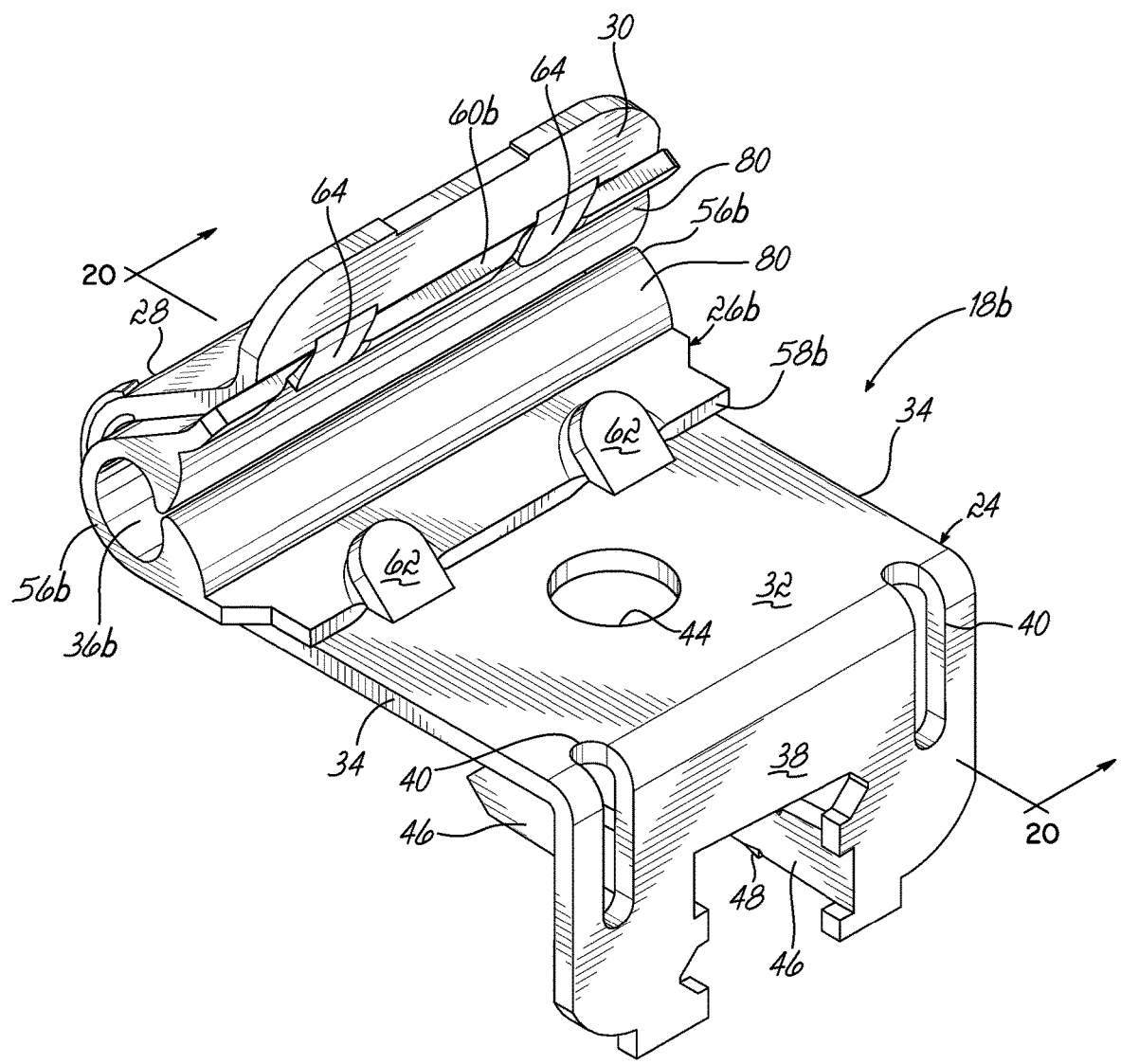
FIG. 18 is an enlarged perspective view of an alternative embodiment of clip assembly.

FIG. 18 illustrates an alternative embodiment of clip assembly 18b having the same first piece or metal clip 24 as the clip assembly 18 shown herein and described above. However, in clip assembly 18b, the second piece or plastic liner 26b is different than the plastic liner 26 shown herein and described above. Although FIGS. 18-24 illustrate the plastic liner 26b being used with a metal clip 24, the plastic liner 26b may be used in conjunction with a prior art metal clip like the one shown in FIG. 1 lacking any detent.

As best shown in FIG. 18, the plastic liner 26b has two teeth 80, each tooth 80 extending from one side edge 56b to the other side edge 56b. Each tooth 80 narrows as it extends away from the remainder of the plastic liner 26b. Each tooth 80 also bends towards the other tooth 80. The linear distance between the side edges 56b defines a width W2 greater than the width W1 of the metal clip 24 of the clip assembly 18.

The plastic liner 26b of clip assembly 18b also has a front or first edge 58b and a rear or second edge 60b. As best shown in FIG. 18, the plastic liner 26b of clip assembly 18b is secured in the U-shaped hook portion 28 of the metal clip 24 of clip assembly 18 with four tabs 62, 64 formed from the material of the metal clip 24. More specifically, two of the tabs 62 are formed from the material of the body portion 32 of the metal clip 24, and the other two tabs 64 are formed from the material of the U-shaped hook portion 28 of the metal clip 24. As best shown in FIG. 18, tabs 62 lay over the front or first edge 58b of the plastic liner 26b of clip assembly 18b and tabs 64 lay over the rear or second edge 60b of the plastic liner 26 of clip assembly 18b. One purpose of the plastic liner 26b is to prevent noise from an end portion 22 of a sinuous spring 20 from directly contacting the metal clip 24 of clip assembly 18b, thereby avoiding metal-to-metal contact. Another purpose of the plastic liner 26b is to secure an end portion 22 of a sinuous spring 20 in place in the U-shaped hook portion 28 of the metal clip 24, thereby preventing the end portion 22 of a sinuous spring 20 from disengaging from the clip assembly 18b.

Figure 20:
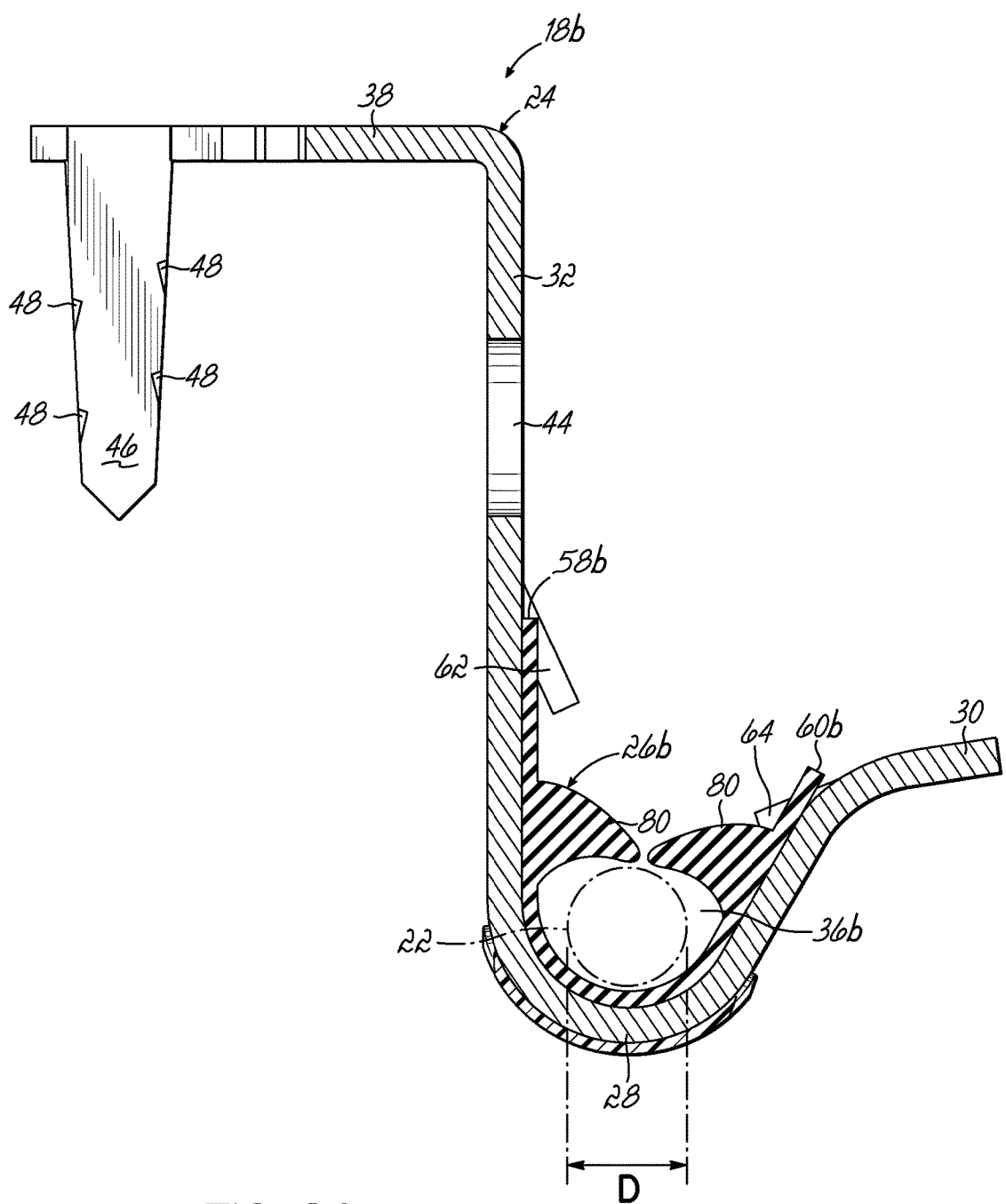
FIG. 20 is a cross-sectional view of the clip assembly taken along the line 20-20 of FIG. 18.

As shown in FIG. 20, the purpose of the teeth 80 of the plastic liner 26b is to secure an end portion 22 of a sinuous spring 20 in place in the U-shaped hook portion 28 of the metal clip 24 without the need for a tool to further bend the metal clip 24. The teeth 80 prevent the end portion 22 of a sinuous spring 20 from disengaging from the clip assembly 18b when outside forces are applied to the sinuous spring, such as when someone sits on a couch. As shown in FIG. 20, when the plastic liner 26b is secured inside the U-shaped hook portion 28 of the metal clip 24 with tabs 62, 64 as described above, the linear distance between the teeth 80 of the plastic liner 26b is less than the diameter D of an end portion 22 of a sinuous spring 20. The location of the teeth 80 of the plastic liner 26b relative to the end portion 22 of a sinuous spring 20 prevents the end portion 22 of a sinuous spring 20 from disengaging from the clip assembly 18b. The teeth 80 of the plastic liner 26b maintain an end portion 22 of a sinuous spring 20 inside a receptacle 36b of the plastic liner 26b.

Figure 21A:
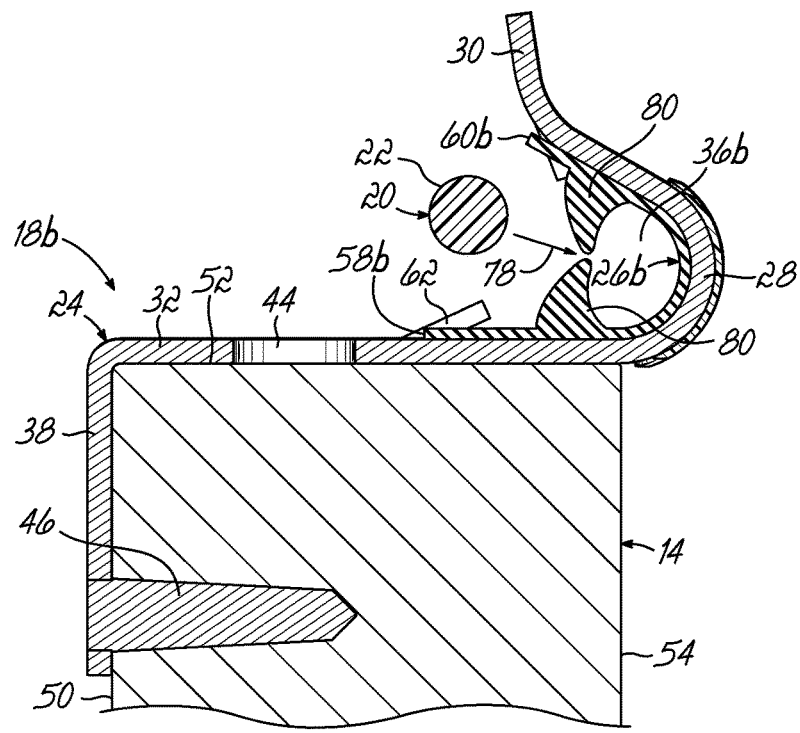
FIG. 21A is a cross-sectional view of the clip assembly of FIG. 18, an end portion of a sinuous spring being inserted into the receptacle of the clip assembly.
Figure 21B:
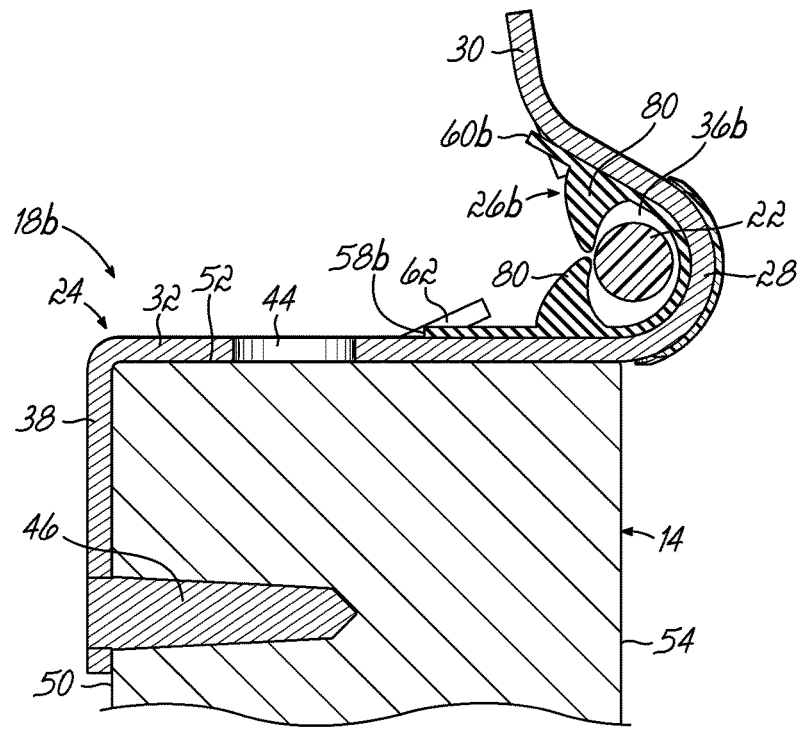
FIG. 21B is a cross-sectional view of the clip assembly of FIG. 18, an end portion of a sinuous spring being secured in the receptacle of the clip assembly.

FIGS. 21A and 21B illustrate a method of securing an end portion 22 of a sinuous spring 20 inside a clip assembly 18b. As shown in FIG. 14A, the end portion 22 of one of the sinuous springs 20 is inserted between the teeth 80 of the plastic liner 26b secured inside the U-shaped hook portion 28 of the metal clip 24 by a force being applied in the direction shown by arrow 78. Due to the configuration and location of the teeth 80 of the plastic liner 26b, a force must be exerted in the direction of arrow 78 to force the end portion 22 of the sinuous spring 20 into a receptacle 36b. Unlike the clip assembly 18 described above, the U-shaped hook portion 28 of metal clip 24 does not move during the insertion process. As shown in FIG. 21B, the end portion 22 of one of the sinuous springs 20 remains inside the receptacle 36b due to the location and shape of the teeth 80 of the plastic liner 26b. Due to its unique configuration, the plastic liner 26b secured inside the U-shaped hook portion 28 of the metal clip 24 better holds or retains an end portion 22 of a sinuous spring 20 in the receptacle 36b, illustrated in FIGS. 21A and 21B.

Figure 22:
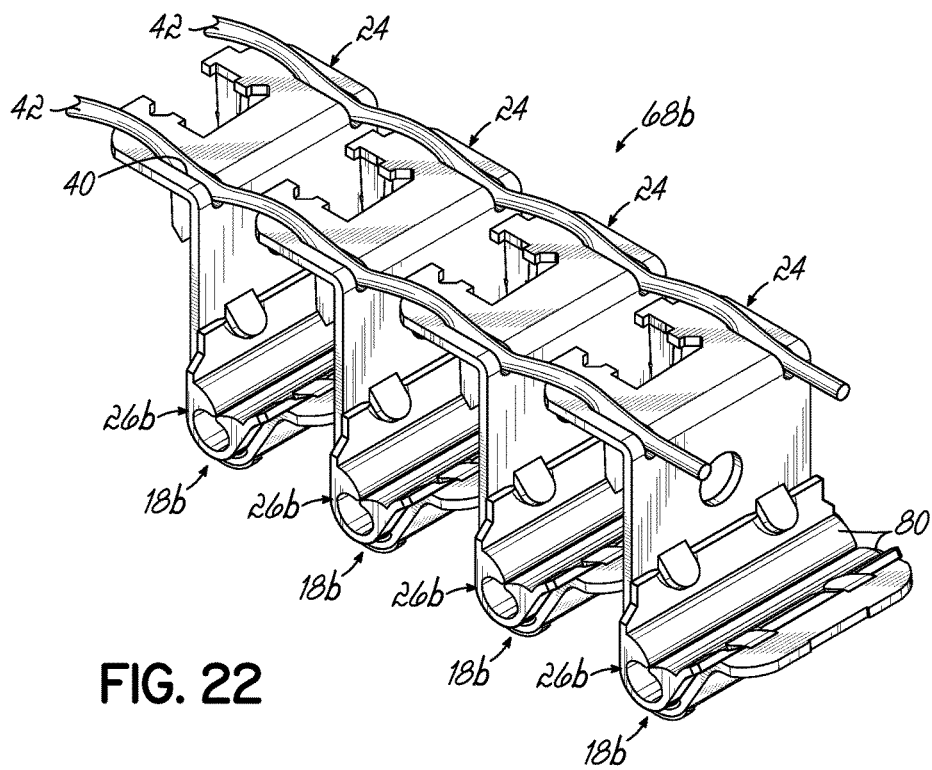
FIG. 22 is a perspective view of a portion of a collated string of clip assemblies of FIG. 18.
Figure 23:
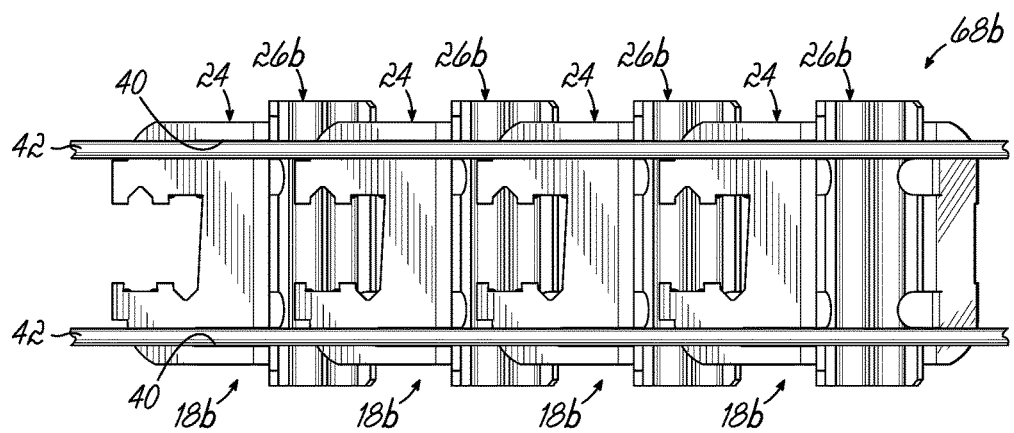
FIG. 23 is a top plan view of the portion of the collated string of clip assemblies of FIG. 22.
Figure 24:
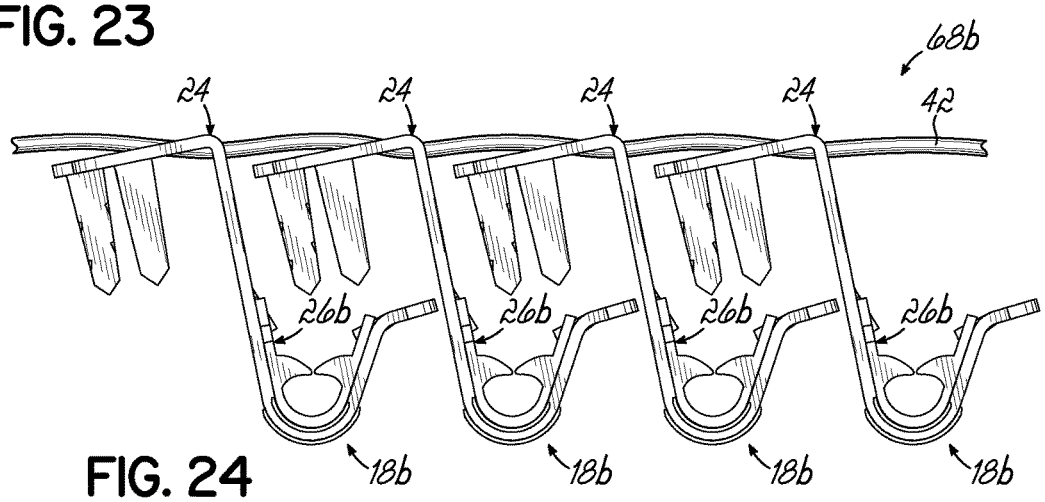
FIG. 24 is a side elevational view of the portion of the collated string of clip assemblies of FIG. 22.

FIG. 22 shows four clip assemblies 18b aligned in a similar orientation and having the flange portion 34 of the metal clip 24 of clip assembly 18b contacting or proximate the body portion 32 of the metal clip 24 of an adjacent clip assembly 18b. When the clip assemblies are juxtaposed in such a manner, the grooves 40 of each clip assembly 18b are co-linearly aligned to permit a flexible connector 42 to be inserted into each of the aligned grooves 40 and extend the length of the aligned clip assemblies 18b. As best shown in FIGS. 23-24, the two flexible connectors 42 are pinched or sandwiched inside the grooves 40 of each clip assembly 18b, each flexible connector 42 being inside a plurality of aligned grooves 40 of multiple clip assemblies 18b.

Although FIGS. 15-17 show four clip assemblies 18b aligned in a string 68b of aligned collated clip assemblies 18b, the string 68b of aligned collated clip assemblies 18b may be made of any number of clip assemblies 18b connected together. In each of the aligned collated clip assemblies 18b, the connectors 42 are pinched or sandwiched inside the grooves 40 of each collated clip assembly 18b.

The connectors 42 used to interconnect adjacent aligned clip assemblies 18b into a string 68b are preferably fabricated from a plastic material, such as a low or high density polyethylene or polyester plastic. The connectors 42 provide flexibility in the collated string 68b of clip assemblies 18b, which is needed when the string 68b is bent and rolled into a spool for insertion into a clinching tool. The connectors 42 have the required tensile strength to withstand pulling and twisting forces without breaking. Also, when a last clip assembly is cut off from the string 68b, there are no sharp or jagged barbs left over to injure workers or tear fabric covering the clipped wires.

Figure 18A:
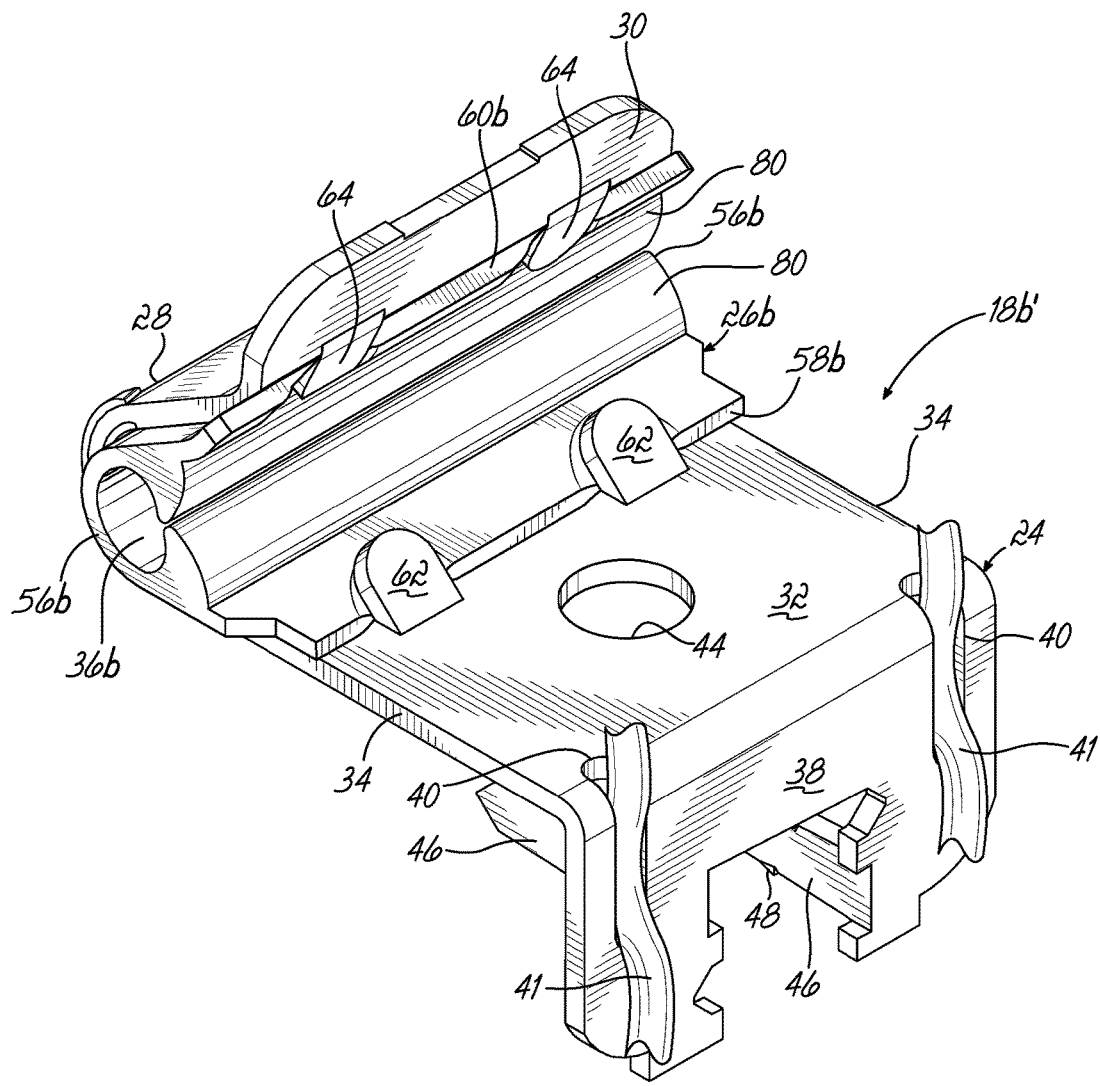
FIG. 18A is an enlarged perspective view of the clip assembly of FIG. 18 showing pieces of connector secured to the clip assembly.
Figure 19:
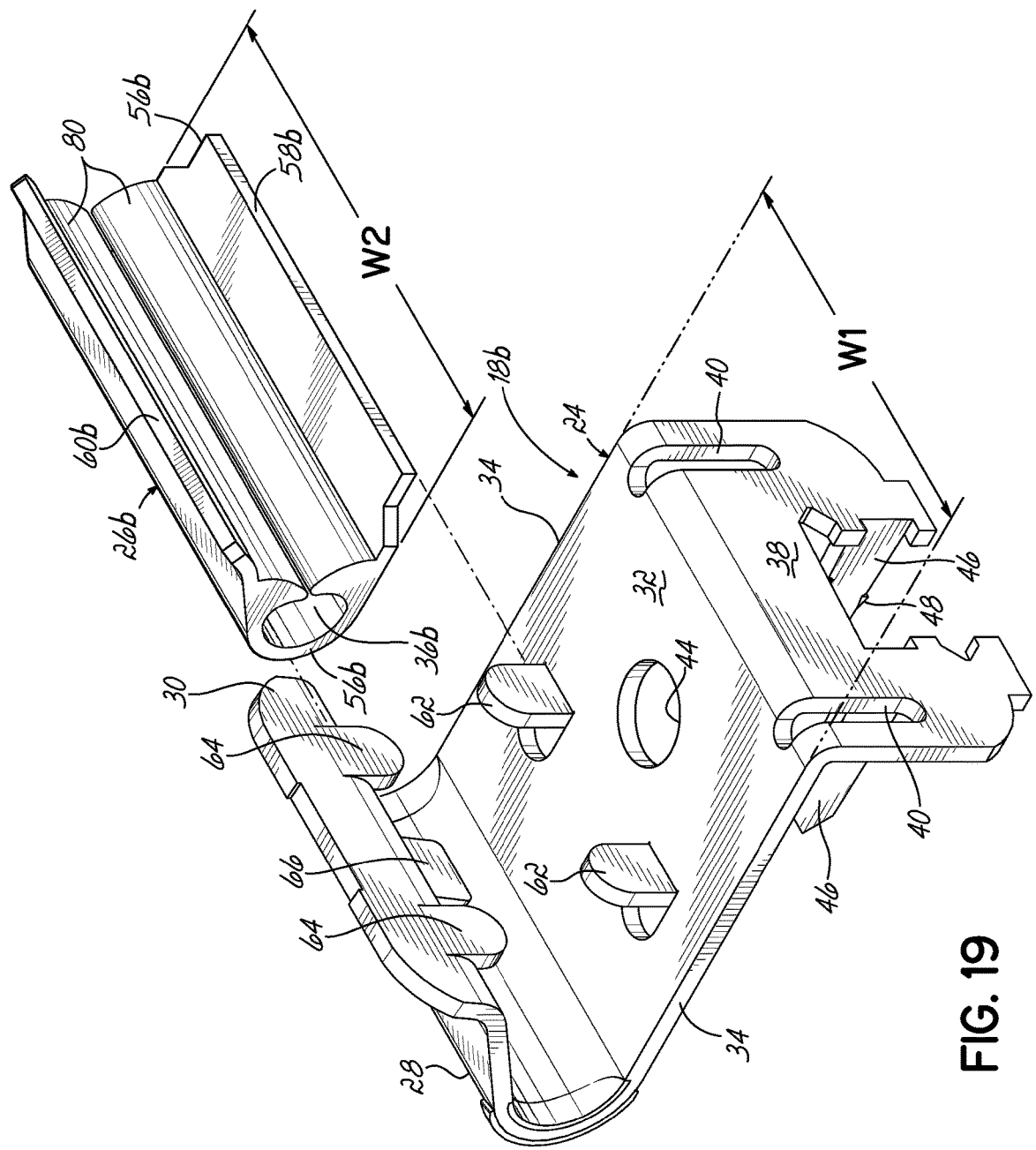
FIG. 19 is a partially disassembled view of the clip assembly of FIG. 18.

When used in a clipping tool, the connectors 42 may be broken between adjacent clip assemblies 18b in the collated string 68b of clip assemblies 18b, leaving portions 41 of the connectors 42 with the clip assembly 18b secured to the frame 12. FIG. 18A illustrates two such clip assemblies 18b', each clip assembly 18b' having portions 41 of the connectors 42 still with the clip assembly 18b' when the clip assembly 18b' is secured to one of the side walls 14 of frame 12.

Although the tacks and/or teeth are shown having a certain size and shape, either one may be other sizes or shapes. Similarly, the tabs formed from the metal clip of the clip assembly may be any desired shapes or sizes. Although we have described several embodiments of the invention, we do not intend to be limited except by the scope of the following claims.

We claim:

1. A clip assembly for securing an end portion of a sinuous spring to a wooden rail, said clip assembly comprising: a metal clip having a generally planar body portion and a generally planar flange portion extending outwardly from one end of the body portion opposite a U-shaped hook portion in a direction perpendicular to the body portion, the flange portion having at least two tacks extending outwardly from the flange portion and spaced grooves adapted to receive flexible connectors to join multiple clip assemblies together, the U-shaped hook portion having a detent formed from the material of the metal clip creating an opening in the U-shaped hook portion of the metal clip, the detent extending towards the generally planar body portion of the metal clip; and a plastic liner wherein the plastic liner is secured in the U-shaped hook portion of the metal clip via tabs formed from the material of the metal clip, the plastic liner overlaying the detent resulting in a curved portion of the plastic liner to inhibit movement of the end portion of the sinuous spring.

2. The clip assembly of claim 1 wherein the plastic liner is secured in the U-shaped hook portion of the metal clip via four tabs formed from the material of the metal clip.

3. The clip assembly of claim 2 wherein two of the tabs are formed from material from the body portion and two of the tabs are formed from material from the U-shaped hook portion.

4. The clip assembly of claim 1 wherein each of the tacks of the metal clip has teeth.

5. The clip assembly of claim 1 wherein at least one of the tacks of the metal clip has teeth.

6. The clip assembly of claim 1 wherein the metal clip has two tacks.

7. The clip assembly of claim 1 wherein the U-shaped hook portion has a reverse bend portion.

8. A clip assembly for securing an end portion of a sinuous spring to a wooden rail, said clip assembly comprising: a metal clip having a generally planar body portion having two tabs formed therein and a generally planar flange portion extending outwardly from one end of the body portion opposite a U-shaped hook portion, the flange portion having tacks extending outwardly from the flange portion adapted to penetrate the wooden rail, the U-shaped hook portion having two tabs and a detent formed from the material of the metal clip creating an opening in the U-shaped hook portion of the metal clip, the detent being located between the two tabs of the U-shaped hook portion and extending towards the generally planar body portion of the metal clip; and a plastic liner secured inside the U-shaped hook portion of the metal clip via the tabs formed from the material of the metal clip, the plastic liner overlaying the detent resulting in a curved portion of the plastic liner to further prevent noise and inhibit movement of the end portion of the sinuous spring.

9. The clip assembly of claim 8 wherein the flange portion extends in a direction generally perpendicular to the body portion of the metal clip.

10. The clip assembly of claim 8 wherein the flange portion of the metal clip has spaced grooves adapted to receive flexible connectors to join multiple clip assemblies together.

11. The clip assembly of claim 8 wherein each of the tacks of the metal clip has teeth.

12. The clip assembly of claim 8 wherein at least one of the tacks of the metal clip has teeth.

13. The clip assembly of claim 8 wherein the metal clip has two tacks.

14. The clip assembly of claim 8 wherein the U-shaped hook portion has a reverse bend portion.

15. A clip assembly for securing an end portion of a sinuous spring to a wooden rail, said clip assembly comprising: a metal clip having a body portion having two tabs formed from the material of the metal clip and a flange portion extending outwardly from one end of the body portion opposite a U-shaped hook portion, the flange portion having tacks formed from the material of the metal clip, the tacks extending outwardly from the flange portion and being adapted to penetrate the wooden rail, the U-shaped hook portion having two tabs and a detent formed from the material of the metal clip creating an opening in the U-shaped hook portion of the metal clip, the detent being located between the-two-tabs of-the U-shaped hook portion and extending towards the body portion of the metal clip; and a plastic liner secured inside the U-shaped hook portion of the metal clip underneath the tabs, the plastic liner overlaying the detent resulting in a curved portion of the plastic liner to further prevent noise.

16. The clip assembly of claim 15 wherein the metal clip is a unitary member, the tacks of the metal clip being formed from the material of the metal clip and extending outwardly from the remainder of the metal clip.

17. The clip assembly of claim 15 wherein at least one of the tacks of the metal clip has teeth.

18. The clip assembly of claim 15 wherein each of the tacks of the metal clip has teeth.

19. The clip assembly of claim 15 wherein the metal clip has two tacks.

20. The clip assembly of claim 15 wherein the plastic liner is made of polypropylene.

\* \* \* \* \*

UNITED STATES PATENT AND TRADEMARK OFFICE
CERTIFICATE OF CORRECTION

PATENT NO. : 9,933,000 B2
APPLICATION NO. : 14/744670
DATED : April 3, 2018
INVENTOR(S) : Lawrence J. Conway et al.

It is certified that error appears in the above-identified patent and that said Letters Patent is hereby corrected as shown below:

In the Claims

Column 12
Line 19, "the-two-tabs of-the" should be ---the two tabs of the---.

Signed and Sealed this
Twelfth Day of June, 2018

Andrei Iancu
*Director of the United States Patent and Trademark Office*